(12) United States Patent
Hamasaki et al.

(10) Patent No.: US 7,099,576 B2
(45) Date of Patent: Aug. 29, 2006

(54) LENS BARREL INCORPORATING A ONE-WAY ROTATIONAL TRANSFER MECHANISM

(75) Inventors: Takuji Hamasaki, Saitama (JP); Makoto Iikawa, Saitama (JP)

(73) Assignee: PENTAX Corporation, Tokyo (JP)

( * ) Notice: Subject to any disclaimer, the term of this patent is extended or adjusted under 35 U.S.C. 154(b) by 134 days.

(21) Appl. No.: 10/958,219

(22) Filed: Oct. 5, 2004

(65) Prior Publication Data

US 2005/0094992 A1    May 5, 2005

(30) Foreign Application Priority Data

Oct. 6, 2003 (JP) ............................. 2003-346445
Oct. 24, 2003 (JP) ............................. 2003-364841

(51) Int. Cl.
*G03B 3/10* (2006.01)
*G03B 13/34* (2006.01)
*G02B 15/14* (2006.01)
*F16D 23/00* (2006.01)

(52) U.S. Cl. .................... 396/144; 396/72; 396/79; 359/694; 359/696; 359/823; 192/32

(58) Field of Classification Search ............... 396/72, 396/79, 85, 137, 144, 146; 359/694, 696, 359/697, 823; 192/31, 32, 38, 219.3, 223.2
See application file for complete search history.

(56) References Cited

U.S. PATENT DOCUMENTS

| 5,052,781 A | 10/1991 | Iizuka ......................... 359/823 |
| 5,239,417 A * | 8/1993 | Eguchi et al. ............... 359/823 |
| 5,915,514 A * | 6/1999 | Nojiri et al. .................. 192/38 |
| 6,788,890 B1 * | 9/2004 | Suzuki ........................ 396/137 |
| 6,827,190 B1 * | 12/2004 | Hamasaki .................... 192/38 |
| 6,879,445 B1 * | 4/2005 | Hamasaki .................... 359/696 |
| 2005/0115358 A1 * | 6/2005 | Hamasaki et al. ............. 74/640 |

FOREIGN PATENT DOCUMENTS

| JP | 2-253210 | 10/1990 |
| JP | 2-253214 | 10/1990 |
| JP | 11-23939 | 1/1999 |
| JP | 11-202181 | 7/1999 |

OTHER PUBLICATIONS

U.S. Appl. No. 10/952,727 to Hamasaki et al., filed Sep. 30, 2004.
U.S. Appl. No. 10/971,118 to Iikawa et al., filed Oct. 25, 2004.

* cited by examiner

*Primary Examiner*—W B Perkey
*Assistant Examiner*—Rishi Suthar
(74) *Attorney, Agent, or Firm*—Greenblum & Bernstein, P.L.C.

(57) ABSTRACT

A lens barrel includes a distance adjustment ring for moving a movable lens group; a hand-operated ring and a motor for rotating the distance adjustment ring; a one-way rotational transfer mechanism which transfers torque of the hand-operated ring to the distance adjustment ring when the hand-operated ring is manually rotated, and prevents torque of the distance adjustment ring transferring to the hand-operated ring when the distance adjustment ring is rotated by the motor. A circumferentially-uneven-width-space forming portion formed on an annular overlapping portion of the hand-operated ring, is shaped so that a torque transfer member, installed in an accommodation space between the annular overlapping portion and a torque transfer cylindrical surface on the distance adjustment ring, wedges between the circumferentially-uneven-width-space forming portion and the torque transfer cylindrical surface to transfer the torque of the manually rotated hand-operated ring to the distance adjustment ring.

69 Claims, 12 Drawing Sheets

LENS BARREL INCORPORATING A ONE-WAY ROTATIONAL TRANSFER MECHANISM

BACKGROUND OF THE INVENTION

1. Field of the Invention

The present invention relates to a lens barrel which incorporates a one-way rotational transfer mechanism.

2. Description of the Related Art

Among conventional lens barrels available for both autofocus (AF) and manual focus (MF), a lens barrel including a stationary ring, a movable ring, a distance adjustment ring, and an AF motor and a manual focus ring, wherein the movable ring is concentrically arranged with the stationary ring, supports a focusing lens group and is movable forward and rearward along an optical axis, wherein the distance adjustment ring is concentrically arranged with the stationary ring and rotates on an axis of the distance adjustment ring to move the movable ring forward and rearward along the optical axis, wherein the AF motor drives the distance adjustment ring, and wherein the manual focus ring is manually rotated about its axis to rotate the distance adjustment ring, is known in the art.

Such a conventional lens barrel is disclosed in, e.g., Japanese Unexamined Patent Publication H02-253214 and Japanese Unexamined Patent Publication H02-253210.

In the lens barrel disclosed in Japanese Unexamined Patent Publication H02-253214, the manual focus ring rotates while an autofocusing operation is performed because a driving force of an AF motor is transferred to the manual focus ring during the autofocusing operation. Accordingly, the autofocusing operation is not performed smoothly if the user touches their hand on the manual focus ring during the autofocusing operation.

On the other hand, in the lens barrel disclosed in Japanese. Unexamined Patent Publication H02-253210, although the manual focus ring does not rotate even if a driving force of an AF motor is transferred to the manual focus ring during the autofocusing operation, the manual focus ring cannot be easily rotated manually because a predetermined load is continuously applied to the manual focus ring so that the manual focus ring cannot rotate by the driving force of the AF motor during the autofocusing operation.

In addition, among the aforementioned conventional lens barrels usable for both autofocus (AF) and manual focus (MF), a lens barrel which incorporates a one-way rotational transfer mechanism between the distance adjustment ring and an AF motor, wherein a torque of the distance adjustment ring rotated by a rotation of the manual focus ring is not transferred to the AF motor when the manual focus ring is manually rotated even though a driving force of the AF motor is transferred to the distance adjustment ring when the AF motor is driven, is known in the art.

This type of lens barrel is disclosed in e.g., Japanese Unexamined Patent Publication H11-202181. In this type of lens barrel, a manual focusing operation can be carried out even in AF mode with an AF switch remained ON.

However, in the lens barrel disclosed in Japanese Unexamined Patent Publication H11-202181, there is a possibility of the one-way rotational transfer mechanism becoming incapable of securely transferring torque from the. AF motor to the distance adjustment ring to thereby make it impossible to perform an autofocusing operation when the AF motor is driven.

SUMMARY OF THE INVENTION

The present invention provides a lens barrel in which a distance adjustment ring for moving a movable lens group is rotated not only by motor but also manually, wherein a torque of the manual focus ring when manually rotated is securely transferred to the distance adjustment ring though a torque of the distance adjustment ring which is rotated by motor is not transferred to the manual focus ring, and further wherein the manual focus ring can be manually rotated smoothly.

The present invention further provides a lens barrel in which a movable lens group is moved selectively by one of a driving force of a motor and a torque of a hand-operated ring, wherein the driving force of the motor is securely transferred to the movable lens group to move the movable lens group when the motor is driven to rotate.

According to an aspect of the present invention, a lens barrel is provided, including a distance adjustment ring which is rotatable by a motor and which moves a movable lens group along the optical axis when the distance adjustment ring is rotated on about an axis thereof; a hand-operated ring which rotates the distance adjustment ring when the hand-operated ring is manually rotated; and a first one-way rotational transfer mechanism which transfers torque of the hand-operated ring to the distance adjustment ring when the hand-operated ring is manually rotated, and for preventing torque of the distance adjustment ring from being transferred to the hand-operated ring when the distance adjustment ring is rotated by the motor. The first one-way rotational transfer mechanism includes an annular overlapping portion formed on the hand-operated ring and overlaps the distance adjustment ring in a radial direction of the lens barrel; a first orthogonal surface formed on the hand-operated ring to lie in a plane orthogonal to an axis of the hand-operated ring; a first torque transfer cylindrical surface formed on one of an inner peripheral surface and an outer peripheral surface of the distance adjustment ring to face the annular overlapping portion; at least one first circumferentially-uneven-width-space forming portion formed on the annular overlapping portion to form at least one first accommodation space between the annular overlapping portion and the first torque transfer cylindrical surface, the first accommodation space having different radial widths at different circumferential positions; a first differential rotating member installed in the first accommodation space, and pressed against the first orthogonal surface by a first biasing device, the first differential rotating member revolving about the axis of the hand-operated ring in a same direction as a rotational direction of the hand-operated ring while revolving at a slower speed than the rotation of the hand-operated ring in association with the rotation of the hand-operated ring; and at least one first torque transfer member installed in the first accommodation space, the first torque member revolving around the axis of the hand-operated ring in a same revolving direction as the first differential rotating member when pressed by the first differential rotating member. The first circumferentially-uneven-width-space forming portion is shaped so that the first torque transfer member which revolves in a circumferential direction about the axis of the hand-operated ring wedges between the circumferentially-uneven-width-space forming portion and the first torque transfer cylindrical surface to transfer the torque of the hand-operated ring to the distance adjustment ring when the hand-operated ring is manually rotated.

It is desirable for the first torque transfer member to be a pair of first torque transfer members which are provided on opposite sides of the first differential rotating member in the circumferential direction in a manner so as to support the first differential rotating member.

It is desirable for at least a portion of the first circumferentially-uneven-width-space forming portion is formed by at least one first circumferentially-uneven-depth groove having different radial depths at different circumferential positions.

The lens barrel can include a first pressing member having a first pressing surface which faces the first orthogonal surface to be parallel thereto. The first pressing member is continuously biased toward the first orthogonal surface by the first biasing device to hold the first differential rotating member between the first pressing surface and the first orthogonal surface.

It is desirable for the first accommodation space to be a plurality of first accommodation spaces formed between the annular overlapping portion and the first torque transfer cylindrical surface, wherein the first differential rotating member and the first torque transfer member are installed in each of the plurality of first accommodation spaces.

It is desirable for the first torque transfer member to be formed as a cylindrical member having an axis which is parallel to the axis of the hand-operated ring.

It is desirable for the lens barrel to include a second one-way rotational transfer mechanism which transfers a driving force of the motor to the distance adjustment ring when the motor is driven, and for preventing the torque of the distance adjustment ring from being transferred to the motor when the distance adjustment ring is rotated.

It is desirable for the second one-way rotational transfer mechanism to include a rotary input shaft which is driven to rotate by the motor, the rotary input shaft including a second orthogonal surface lying on a plane orthogonal to an axis of the rotary input shaft which is parallel to the optical axis; a hollow-cylindrical rotary output shaft provided around the rotary input shaft to be freely rotatable relative to the rotary input shaft, wherein rotation of the hollow-cylindrical rotary output shaft and rotation of the distance adjustment ring are associated with each other; a second circumferentially-uneven-width-space forming portion formed on the rotary input shaft to form at least one second accommodation space between the rotary input shaft and a second torque transfer cylindrical surface formed on an inner peripheral surface of the hollow-cylindrical rotary output shaft, the second accommodation space having different radial widths at different circumferential positions; a second differential rotating member installed in the second accommodation space, and pressed against the second orthogonal surface by a second biasing device, the second differential rotating member revolving around an axis of the rotary input shaft in a same direction as a rotational direction of the rotary input shaft while revolving at a slower speed than the rotation of the rotary input shaft in association with the rotation of the rotary input shaft; and at least one second torque transfer member installed in the second accommodation space to be freely movable therein, the second torque transfer member revolving around the axis of the rotary input shaft in a same revolving direction as the second differential rotating member when pressed by the second differential rotating member. The second circumferentially-uneven-width-space forming portion is shaped so that the second torque transfer member which revolves in a circumferential direction about the axis of the rotary input shaft wedges between an outer peripheral surface of the rotary input shaft and the second torque transfer cylindrical surface of the hollow-cylindrical rotary output shaft to transfer a torque from the rotary input shaft to the hollow-cylindrical rotary output shaft when the rotary input shaft is rotated.

It is desirable for the second circumferentially-uneven-width-space forming portion to include a portion having a non-circular cross section which includes at least one surface orthogonal to a radial direction of the rotary input shaft.

It is desirable for the second one-way rotational transfer mechanism to include a hollow-cylindrical rotary input shaft driven to rotate by the motor, the hollow-cylindrical rotary input shaft including a second orthogonal surface lying on a plane orthogonal to an axis of the hollow-cylindrical rotary input shaft which is parallel to the optical axis; a rotary output shaft provided radially inside the hollow-cylindrical rotary input shaft to be freely rotatable relative to the hollow-cylindrical rotary input shaft, an outer peripheral surface of the rotary output shaft serving as a second torque transfer cylindrical surface, wherein rotation of the rotary output shaft and rotation of the distance adjustment ring are associated with each other; a second circumferentially-uneven-width-space forming portion formed on an inner peripheral surface of the hollow-cylindrical rotary input shaft to form at least one second accommodation space between the inner peripheral surface of the hollow-cylindrical rotary input shaft and the second torque transfer cylindrical surface, the second accommodation space having different radial widths at different circumferential positions; a second differential rotating member installed in the second accommodation space, and pressed against the second orthogonal surface by a second biasing device, the second differential rotating member revolving around an axis of the hollow-cylindrical rotary input shaft in a same direction as a rotational direction of the hollow-cylindrical rotary input shaft while revolving at a slower speed than the rotation of the hollow-cylindrical rotary input shaft in association with the rotation of the hollow-cylindrical rotary input shaft; and at least one second torque transfer member installed in the second accommodation space to be freely movable therein, the second torque transfer member revolving around the axis of the hollow-cylindrical rotary input shaft in a same revolving direction as the second differential rotating member when pressed by the second differential rotating member. The second circumferentially-uneven-width-space forming portion is shaped so that the second torque transfer member which revolves in a circumferential direction about the axis of the hollow-cylindrical rotary input shaft wedges between the, inner peripheral surface of the hollow-cylindrical rotary input shaft and the second torque transfer cylindrical surface of the rotary output shaft to transfer a torque from the hollow-cylindrical rotary input shaft to the rotary output shaft when the hollow-cylindrical rotary input shaft is rotated.

It is desirable for the second torque transfer member to include a pair of second torque transfer members which are positioned on opposite sides of associated the second differential rotating member along the circumferential direction in a manner so as to hold the associated the second differential rotating member.

It is desirable for the second accommodation space to include a plurality of second accommodation spaces formed between the second circumferentially-uneven-width-space forming portion and the second torque transfer cylindrical surface of the hollow-cylindrical rotary output shaft, and the second differential rotating member includes a plurality of second differential rotating members. One of the second differential rotating members and the at least one second torque transfer member are installed in each of the plurality of second accommodation spaces.

It is desirable for the second one-way rotational transfer mechanism to include a rotary input shaft which is driven to rotate by the motor, the rotary input shaft including a second orthogonal surface lying on a plane orthogonal to an axis of the rotary input shaft which is parallel to the optical axis; a hollow-cylindrical rotary output shaft provided around the rotary input shaft to be freely rotatable relative to the rotary input shaft, an inner peripheral surface of the hollow-cylindrical rotary output shaft serving as a second torque transfer cylindrical surface for forming an annular space between the second torque transfer cylindrical surface and an outer peripheral surface of the rotary input shaft, wherein rotation of the hollow-cylindrical rotary output shaft and rotation of the distance adjustment ring are associated with each other; a second circumferentially-uneven-width-space forming portion formed on the rotary input shaft to form at least one second accommodation space between the rotary input shaft and the second torque transfer cylindrical surface, the second accommodation space having different radial widths at different circumferential positions, and the second accommodation space forming a portion of the annular space which is formed between the second torque transfer cylindrical surface and the outer peripheral surface of the rotary input shaft; a second differential rotating member pressed against the second orthogonal surface by a second biasing device, the second differential rotating member revolving around the axis of the rotary input shaft in a same direction as a rotational direction of the rotary input shaft while revolving at a slower speed than the rotation of the rotary input shaft in association with the rotation of the rotary input shaft; a retainer installed in the annular space, the retainer rotating around the axis of the rotary input shaft in a same rotational direction as the second differential rotating member when pressed by the second differential rotating member; and at least one second torque transfer member supported by the retainer to rotate together with the retainer in the second accommodation space. The second circumferentially-uneven-width-space forming portion is shaped so that the second torque transfer member which rotates in a circumferential direction about the axis of the rotary input shaft wedges between an outer peripheral surface of the rotary input shaft and the second torque transfer cylindrical surface of the hollow-cylindrical rotary output shaft to transfer a torque from the rotary input shaft to the hollow-cylindrical rotary output shaft when the rotary input shaft is rotated.

It is desirable for the second one-way rotational transfer mechanism to include a hollow-cylindrical rotary input shaft which is driven to rotate by the motor, the hollow-cylindrical input shaft including an orthogonal surface lying on a plane orthogonal to an axis of the hollow-cylindrical rotary input shaft which is parallel to the optical axis; a rotary output shaft provided radially inside the hollow-cylindrical rotary input shaft to be freely rotatable relative to the hollow-cylindrical rotary input shaft, an outer peripheral surface of the rotary output shaft serving as a second torque transfer cylindrical surface for forming an annular space between the second torque transfer cylindrical surface and an inner peripheral surface of the hollow-cylindrical rotary input shaft, wherein rotation of the rotary output shaft and rotation of the distance adjustment ring are associated with each other; a second circumferentially-uneven-width-space forming portion formed on the hollow-cylindrical rotary input shaft to form at least one second accommodation space between the hollow-cylindrical rotary input shaft and the second torque transfer cylindrical surface, the second accommodation space having different radial widths at different circumferential positions, and the second accommodation space forming a portion of the annular space that is formed between the second torque transfer cylindrical surface and the inner peripheral surface of the hollow-cylindrical rotary input shaft; a second differential rotating member pressed against the second orthogonal surface by a second biasing device, the second differential rotating member revolving around the axis of the hollow-cylindrical rotary input shaft in a same direction as a rotational direction of the hollow-cylindrical rotary input shaft while revolving at a slower speed than the rotation of the hollow-cylindrical rotary input shaft in association with the rotation of the hollow-cylindrical rotary input shaft; a retainer installed in the annular space, the retainer rotating around the axis of the hollow-cylindrical rotary input shaft in a same rotational direction as the second differential rotating member when pressed by the second differential rotating member; and at least one second torque transfer member supported by the retainer to rotate together with the retainer in the second accommodation space. The second circumferentially-uneven-width-space forming portion is shaped so that the second torque transfer member which rotates in a circumferential direction about the axis of the hollow-cylindrical rotary input shaft wedges between an inner peripheral surface of the hollow-cylindrical rotary input shaft and the second torque transfer cylindrical surface of the rotary output shaft to transfer a torque from the hollow-cylindrical rotary input shaft to the rotary output shaft when the hollow-cylindrical rotary input shaft is rotated.

It is desirable for the lens barrel to include a second pressing member having a second pressing surface which faces the second orthogonal surface to be parallel thereto, wherein the second pressing member is continuously biased toward the second orthogonal surface by the second biasing device to hold the second differential rotating member between the second pressing surface and the second orthogonal surface.

It is desirable for the second accommodation space to include a plurality of second accommodation spaces formed between the hollow-cylindrical rotary output shaft and the second torque transfer cylindrical surface, wherein the second torque transfer member is installed in each the plurality of second accommodation spaces.

It is desirable for the second accommodation space to include a plurality of second accommodation spaces formed between the rotary output shaft and the second torque transfer cylindrical surface, wherein the second torque transfer member is installed in each the plurality of second accommodation spaces.

It is desirable for the second circumferentially-uneven-width-space forming portion to include at least one second circumferentially-uneven-depth groove having different radial depths at different circumferential positions.

It is desirable for the rotary input shaft to include an input gear which is in mesh with an output gear of the motor. Upon rotation of the hollow-cylindrical rotary output shaft being stopped, the motor is rotated in a rotational direction opposite to the previous rotational direction of the motor by an angle of rotation smaller than backlash between the input gear and the output gear to rotate the rotary input shaft in a rotational direction opposite to the previous rotational direction of the rotary input shaft without rotating the hollow-cylindrical rotary output shaft.

It is desirable for the hollow-cylindrical rotary input shaft to include an input gear which is in mesh with an output gear of the motor. Upon rotation of the rotary output shaft being stopped, the motor is rotated in a rotational direction opposite to the previous rotational direction of the motor by an angle of rotation smaller than backlash between the input gear and the output gear to rotate the hollow-cylindrical rotary input shaft in a rotational direction opposite to the previous rotational direction of the hollow-cylindrical rotary input shaft without rotating the rotary output shaft.

The second torque transfer member can be formed as a cylindrical member, an axis of which is parallel to the axis of the rotary input shaft.

The second torque transfer member can be formed as a cylindrical member, an axis of which is parallel to the axis of the hollow-cylindrical rotary input shaft.

It is desirable for the movable lens group to serve as a focusing lens group, the motor to serve as an AF motor which moves the movable lens group along the optical axis to perform a focusing operation, and the hand-operated ring to serve as a manual focus ring which is manually rotated to perform the focusing operation.

The movable lens group can be an element of a zooming optical system of the lens barrel, the motor can serve as a zoom motor which moves the movable lens group along the optical axis to perform the zooming operation, and the hand-operated ring can serve as a zoom ring which is manually rotated to perform the zooming operation.

The second biasing device can be an annular leaf spring, and the second biasing device can be a compression coil spring.

In another embodiment, a lens barrel is provided, including a hand-operated ring which moves a movable lens group along an optical axis thereof when manually rotated; a motor for moving the movable lens group along the optical axis; and a one-way rotational transfer mechanism which transfers torque of the motor to the movable lens group when the motor is driven, and for preventing a moving force of the movable lens group from being transferred to the motor when the hand-operated ring is manually rotated. The one-way rotational transfer mechanism includes a rotary input shaft driven to rotate by the motor, the rotary input shaft including an orthogonal surface lying on a plane orthogonal to an axis of the rotary input shaft which is parallel to the optical axis; a hollow-cylindrical rotary output shaft provided around the rotary input shaft to be freely rotatable relative to the rotary input shaft, wherein rotation of the hollow-cylindrical rotary output shaft and a movement of the movable lens group along the optical axis are associated with each other; a circumferentially-uneven-width-space forming portion formed on the rotary input shaft to form at least one accommodation space between the rotary input shaft and a torque transfer cylindrical surface formed on an inner peripheral surface of the hollow-cylindrical rotary output shaft, the accommodation space having different radial widths at different circumferential positions; a differential rotating member installed in the accommodation space, and pressed against the orthogonal surface by a biasing device, the differential rotating member revolving around an axis of the rotary input shaft in a same direction as a rotational direction of the rotary input shaft while revolving at a slower speed than the rotation of the rotary input shaft in association with the rotation of the rotary input shaft; and at least one torque transfer member installed in the accommodation space to be freely movable therein, the torque transfer member revolving around the axis of the rotary input shaft in a same revolving direction as the differential rotating member when pressed by the differential rotating member. The circumferentially-uneven-width-space forming portion is shaped so that the torque transfer member which revolves in a circumferential direction about the axis of the rotary input shaft wedges between an outer peripheral surface of the rotary input shaft and the torque transfer cylindrical surface of the hollow-cylindrical rotary output shaft to transfer a torque from the rotary input shaft to the hollow-cylindrical rotary output shaft when the rotary input shaft is rotated.

It is desirable for the torque transfer member to include a pair of torque transfer members which are positioned on opposite sides of associated the differential rotating member along the circumferential direction in a manner so as to support the associated the differential rotating member.

It is desirable for the accommodation space to includes a plurality of accommodation spaces formed between the rotary input shaft and the torque transfer cylindrical surface, and the differential rotating member includes a plurality of differential rotating members. One of the differential rotating members and the at least one the torque transfer member are installed in each the plurality of accommodation spaces.

It is desirable for the circumferentially-uneven-width-space forming portion to include a portion having a non-circular cross section which includes at least one surface orthogonal to a radial direction of the rotary input shaft.

In another embodiment, a lens barrel is provided, including a hand-operated ring which moves a movable lens group along an optical axis thereof when manually rotated; a motor for moving the movable lens group along the optical axis; and a one-way rotational transfer mechanism which transfers torque of the motor to the movable lens group when the motor is driven, and for preventing a moving force of the movable lens group from being transferred to the motor when the hand-operated ring is manually rotated. The one-way rotational transfer mechanism includes a hollow-cylindrical rotary input shaft driven to rotate by the motor, the hollow-cylindrical rotary input shaft including an orthogonal surface lying on a plane orthogonal to an axis of the hollow-cylindrical rotary input shaft which is parallel to the optical axis; a rotary output shaft provided radially inside the hollow-cylindrical rotary input shaft to be freely rotatable relative to the hollow-cylindrical rotary input shaft, an outer peripheral surface of the rotary output shaft serving as a torque transfer cylindrical surface, wherein rotation of the rotary output shaft and movement of the movable lens group along the optical axis are associated with each other; a circumferentially-uneven-width-space forming portion formed on an inner peripheral surface of the hollow-cylindrical rotary input shaft to form at least one accommodation space between the inner peripheral surface of the hollow-cylindrical rotary input shaft and the torque transfer cylindrical surface, the accommodation space having different radial widths at different circumferential positions; a differential rotating member installed in the accommodation space, and pressed against the orthogonal surface by a biasing device, the differential rotating member revolving around an axis of the hollow-cylindrical rotary input shaft in a same direction as a rotational direction of the hollow-cylindrical rotary input shaft while revolving at a slower speed than the rotation of the hollow-cylindrical rotary input shaft in association with the rotation of the hollow-cylindrical rotary input shaft; and at least one torque transfer member installed in the accommodation space to be freely movable therein, the torque transfer member revolving around the axis of the hollow-cylindrical rotary input shaft in a same revolving direction as the differential rotating member when pressed by the differential rotating member. The circumferentially-uneven-width-space forming portion is shaped so that the torque transfer member which revolves in a circumferential direction about the axis of the hollow-cylindrical rotary input shaft wedges between the inner peripheral surface of the hollow-cylindrical rotary input shaft and the torque transfer cylindrical surface of the rotary output shaft to transfer a torque from the hollow-cylindrical rotary input shaft to the rotary output shaft when the hollow-cylindrical rotary input shaft is rotated.

It is desirable for the accommodation space to include a plurality of accommodation spaces formed between the hollow-cylindrical rotary input shaft and the torque transfer cylindrical surface, and the differential rotating member includes a plurality of differential rotating members. One of the differential rotating members and the at least one torque transfer member are installed in each the plurality of accommodation spaces.

It is desirable for the circumferentially-uneven-width-space forming portion to include a portion having a non-circular cross section which includes at least one surface orthogonal to a radial direction of the hollow-cylindrical rotary input shaft.

In another embodiment, a lens barrel is provided, including a hand-operated ring which moves a movable lens group along an optical axis thereof when manually rotated; a motor for moving the movable lens group along the optical axis; and a one-way rotational transfer mechanism which transfers torque of the motor to the movable lens group when the motor is driven, and for preventing a moving force of the movable lens group from being transferred to the motor when the hand-operated ring is manually rotated. The one-way rotational transfer mechanism includes a rotary input shaft driven to rotate by the motor, the rotary input shaft including an orthogonal surface lying on a plane orthogonal to an axis of the rotary input shaft which is parallel to the optical axis; a hollow-cylindrical rotary output shaft provided around the rotary input shaft to be freely rotatable relative to the rotary input shaft, an inner peripheral surface of the hollow-cylindrical rotary output shaft serving as a torque transfer cylindrical surface for forming an annular space between the torque transfer cylindrical surface and an outer peripheral surface of the rotary input shaft, wherein rotation of the hollow-cylindrical rotary output shaft and movement of the movable lens group along the optical axis are associated with each other; a circumferentially-uneven-width-space forming portion formed on the rotary input shaft to form at least one accommodation space between the rotary input shaft and the torque transfer cylindrical surface, the accommodation space having different radial widths at different circumferential positions, and the accommodation space forming a part of the annular space that is formed between the torque transfer cylindrical surface and the outer peripheral surface of the rotary input shaft; a differential rotating member pressed against the orthogonal surface by a biasing device, the differential rotating member revolving around the axis of the rotary input shaft in a same direction as a rotational direction of the rotary input shaft while revolving at a slower speed than the rotation of the rotary input shaft in association with the rotation of the rotary input shaft; a retainer installed in the annular space, the retainer rotating around the axis of the rotary input shaft in a same rotational direction as the differential rotating member when pressed by the differential rotating member; and at least one torque transfer member supported by the retainer to rotate together with the retainer in the accommodation space. The circumferentially-uneven-width-space forming portion is shaped so that the torque transfer member which rotates in a circumferential direction about the axis of the rotary input shaft wedges between an outer peripheral surface of the rotary input shaft and the torque transfer cylindrical surface of the hollow-cylindrical rotary output shaft to transfer a torque from the rotary input shaft to the hollow-cylindrical rotary output shaft when the rotary input shaft is rotated.

In another embodiment, a lens barrel is provided, including a hand-operated ring which moves a movable lens group along an optical axis thereof when manually rotated; a motor for moving the movable lens group along the optical axis; and a one-way rotational transfer mechanism which transfers torque of the motor to the movable lens group when the motor is driven, and for preventing a moving force of the movable lens group from being transferred to the motor when the hand-operated ring is manually rotated. The one-way rotational transfer mechanism includes a hollow-cylindrical rotary input shaft driven to rotate by the motor, the hollow-cylindrical rotary input shaft including an orthogonal surface lying on a plane orthogonal to an axis of the hollow-cylindrical rotary input shaft which is parallel to the optical axis; a rotary output shaft provided radially inside the hollow-cylindrical rotary input shaft to be freely rotatable relative to the hollow-cylindrical rotary input shaft, an outer peripheral surface of the rotary output shaft serving as a torque transfer cylindrical surface for forming an annular space between the torque transfer cylindrical surface and an inner peripheral surface of the hollow-cylindrical rotary input shaft, wherein rotation of the rotary output shaft and movement of the movable lens group along the optical axis are associated with each other; a circumferentially-uneven-width-space forming portion formed on the hollow-cylindrical rotary input shaft to form at least one accommodation space between the hollow-cylindrical rotary input shaft and the torque transfer cylindrical surface, the accommodation space having different radial widths at different circumferential positions, and the accommodation space forming a portion of the annular space that is formed between the torque transfer cylindrical surface and the inner peripheral surface of the hollow-cylindrical rotary input shaft; a differential rotating member pressed against the orthogonal surface by a biasing device, the differential rotating member revolving around the axis of the hollow-cylindrical rotary input shaft in a same direction as a rotational direction of the hollow-cylindrical rotary input shaft while revolving at a slower speed than the rotation of the hollow-cylindrical rotary input shaft in association with the rotation of the hollow-cylindrical rotary input shaft; a retainer installed in the annular space, the retainer rotating around the axis of the hollow-cylindrical rotary input shaft in a same rotational direction as the differential rotating member when pressed by the differential rotating member; and at least one torque transfer member supported by the retainer to rotate together with the retainer in the accommodation space. The circumferentially-uneven-width-space forming portion is shaped so that the torque transfer member which rotates in a circumferential direction about the axis of the hollow-cylindrical rotary input shaft wedges between an inner peripheral surface of the hollow-cylindrical rotary input shaft and the torque transfer cylindrical surface of the rotary output shaft to transfer a torque from the hollow-cylindrical rotary input shaft to the rotary output shaft when the hollow-cylindrical rotary input shaft is rotated.

It is desirable for the accommodation space to include a plurality of accommodation spaces formed between the rotary input shaft and the torque transfer cylindrical surface, wherein the torque transfer member is installed in each the plurality of accommodation spaces.

It is desirable for the circumferentially-uneven-width-space forming portion to include at least one circumferentially-uneven-depth groove having different radial depths at different circumferential positions.

It is desirable for the accommodation space to include a plurality of accommodation spaces formed between the hollow-cylindrical rotary input shaft and the torque transfer cylindrical surface, wherein the torque transfer member is installed in each the plurality of accommodation spaces.

The lens barrel can include a pressing member having a pressing surface which faces the orthogonal surface so as to be parallel thereto, wherein the pressing member is biased toward the orthogonal surface by the biasing device to support the differential rotating member between the pressing surface and the orthogonal surface.

It is desirable for the rotary input shaft to include an input gear which is in mesh with an output gear of the motor. Upon rotation of the rotary output shaft being stopped, the motor is rotated in a rotational direction opposite to the previous rotational direction of the motor by an angle of rotation smaller than backlash between the input gear and the output gear to rotate the rotary input shaft in a rotational direction opposite to the previous rotational direction of the rotary input shaft without rotating the rotary output shaft.

It is desirable for the torque transfer member to be formed as a cylindrical member, an axis of which is parallel to the axis of the rotary input shaft.

The biasing device can be a compression coil spring.

According to an aspect of the present invention, in a lens barrel in which a distance adjustment ring for moving a movable lens group is rotated not only by motor but also manually, a torque of the manual focus ring when manually rotated is securely transferred to the distance adjustment ring even though a torque of the distance adjustment ring which is rotated by motor is not transferred to the manual focus ring; moreover, the manual focus ring can be manually rotated smoothly.

According to another aspect of the present invention, in a lens barrel in which a movable lens group is moved selectively by one of a driving force of a motor and a torque of a hand-operated ring, wherein the driving force of the motor is securely transferred to the movable lens group to move the movable lens group when the motor is driven to rotate.

The present disclosure relates to subject matter contained in Japanese Patent Applications No. 2003-346445 (filed on Oct. 6, 2004) and No. 2003-364841 (filed on Oct. 24, 2004) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENTS

FIGS. 1 through 5 show a first embodiment of a lens barrel which is available for both autofocus (AF) and manual focus (MF), i.e., which can be used for an autofocus camera in which a photographing mode can be switched between AF mode and MF mode. Firstly, the overall structure of this embodiment of the lens barrel 200 will be discussed hereinafter.

Figure 1:
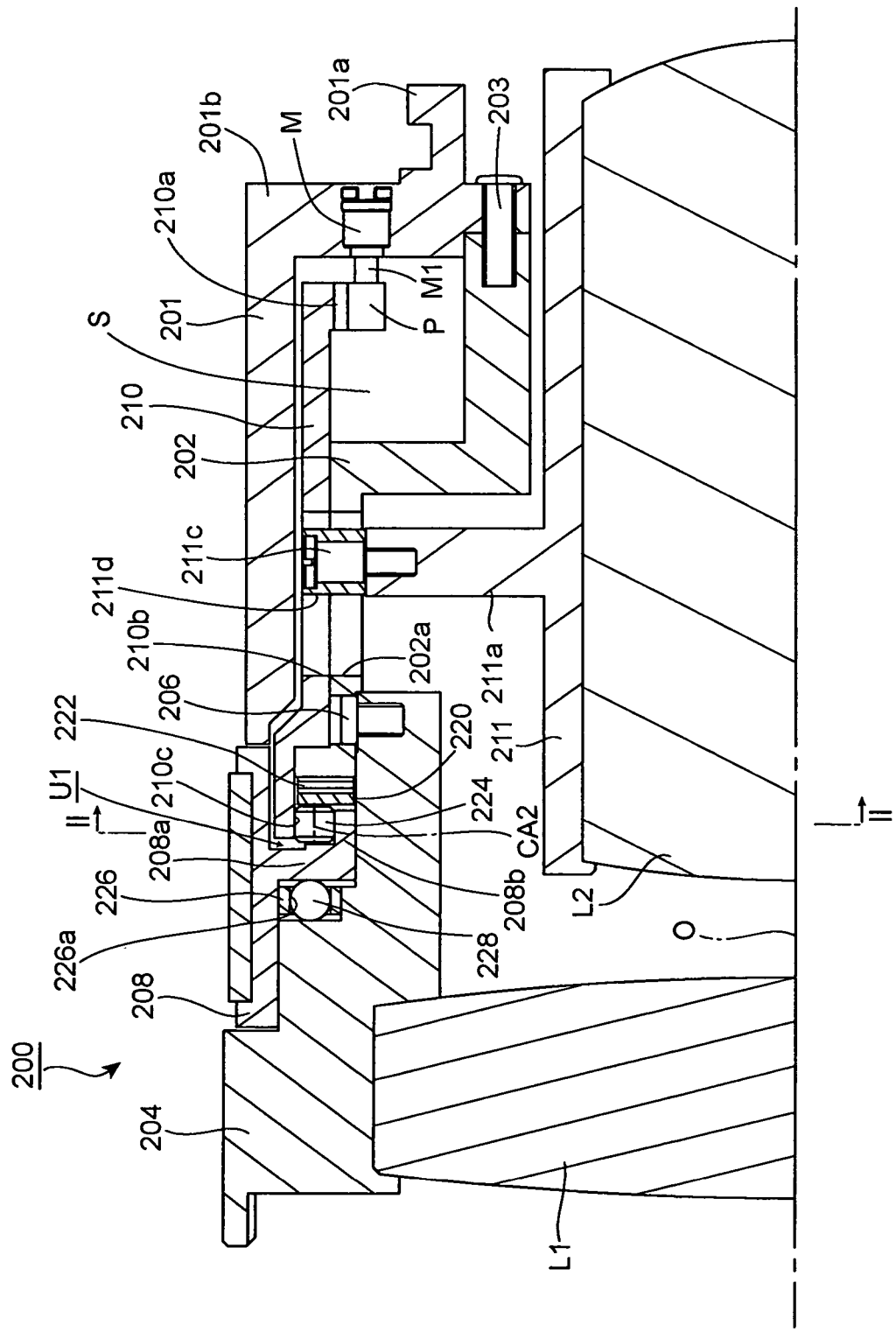
FIG. 1 is a longitudinal cross sectional view of an upper half of a first embodiment of a lens barrel from the optical axis thereof according to the present invention.

In the following descriptions, front and rear of the lens barrel 200 correspond to left and right of the lens barrel 200 as viewed in FIG. 1, respectively. The lens barrel 200 is provided with a first stationary ring 201 having a mount portion (bayonet mount portion) 201a at a rear end of the first stationary ring 201. The mount portion 201a is mounted to a body mount provided on a camera body (not shown) via a bayonet engagement when the lens barrel 200 is attached to the camera body. The lens barrel 200 is provided inside the first stationary ring 201 with a second stationary ring 202 whose rear end is fixed to the rear end of the first stationary ring 201 by set screws 203 (only one of them is shown in FIG. 1). The second stationary ring 202 is provided, at equi-angular intervals in a circumferential direction of the second stationary ring 202, with a set of three linear guide slots 202a extending in the optical axis direction (i.e., in a direction of an optical axis O of the lens barrel 200). The lens barrel 200 is provided between the first stationary ring 201 and the second stationary ring 202 with an accommodation space S which has an annular shape as viewed from the front thereof.

A motor M is embedded in a rear wall 201b of the first stationary ring 201 so that a rotary shaft M1 and a pinion (output gear) P of the motor M project forward to be positioned inside the accommodation space S.

The lens barrel 200 is provided in the front thereof with a lens holder ring 204 which holds a stationary lens group L1. The lens holder ring 204 is fixed at its rear end to an inner peripheral surface of the second stationary ring 202 at a front end thereof by set screws (only one of them is shown in FIG. 1). The lens barrel 200 is provided, in an annular space formed between a front end portion of the first stationary ring 201 and the lens holder ring 204, with a manual focus ring (hand-operated ring) 208 which is concentrically provided with the first stationary ring 201 to be freely rotatable about the optical axis O and to be immovable in the optical axis direction.

The lens barrel 200 is provided in the accommodation space S with a distance adjustment ring 210 which is positioned to be freely rotatable about the optical axis O and to be immovable in the optical axis direction. The distance adjustment ring 210 is provided, circumferentially on the inner peripheral surface of a rear end of the distance adjustment ring 210, with an input gear 210a which is in mesh with the pinion P of the motor M. The distance adjustment ring 210 is provided at equi-angular intervals in a circumferential direction thereof with a set of three cam grooves 210b which extend obliquely to the set of three linear guide slots 202a. The distance adjustment ring 210 is provided, on an inner peripheral surface of a front end portion thereof with an inner peripheral surface (first torque transfer cylindrical surface) 210c which is circular as viewed from front thereof having a central axis which is coincident with the optical axis O. The lens barrel 200 is provided radially inside the second stationary ring 202 with a movable ring 211 for holding a focusing lens group (movable lens group) L2. The movable ring 211 is provided on an outer peripheral surface thereof at equi-angular intervals in a circumferential direction with a set of three radial projections 211a. A roller 211d is fixed to an end surface of each radial projection 211a via a set screw 211c. Each roller 211d is engaged with both the associated linear guide slot 202a and the associated cam groove 210b, so that forward and reverse rotations of the distance adjustment ring 210 which are caused by forward and reverse rotations of the motor M cause the focusing lens group L2 (the movable ring 211) to move forward and rearward along the set of three linear guide slots 202a, respectively.

The manual focus ring 208 is provided on an inner peripheral surface thereof with an annular wall 208a which projects radially inwards from the inner peripheral surface of the manual focus ring 208. The manual focus ring 208 is further provided at the inner edge of the annular wall 208a with an annular projection (annular overlapping portion) 208b which projects rearward from the inner edge of the annular wall 208a.

Figure 2:
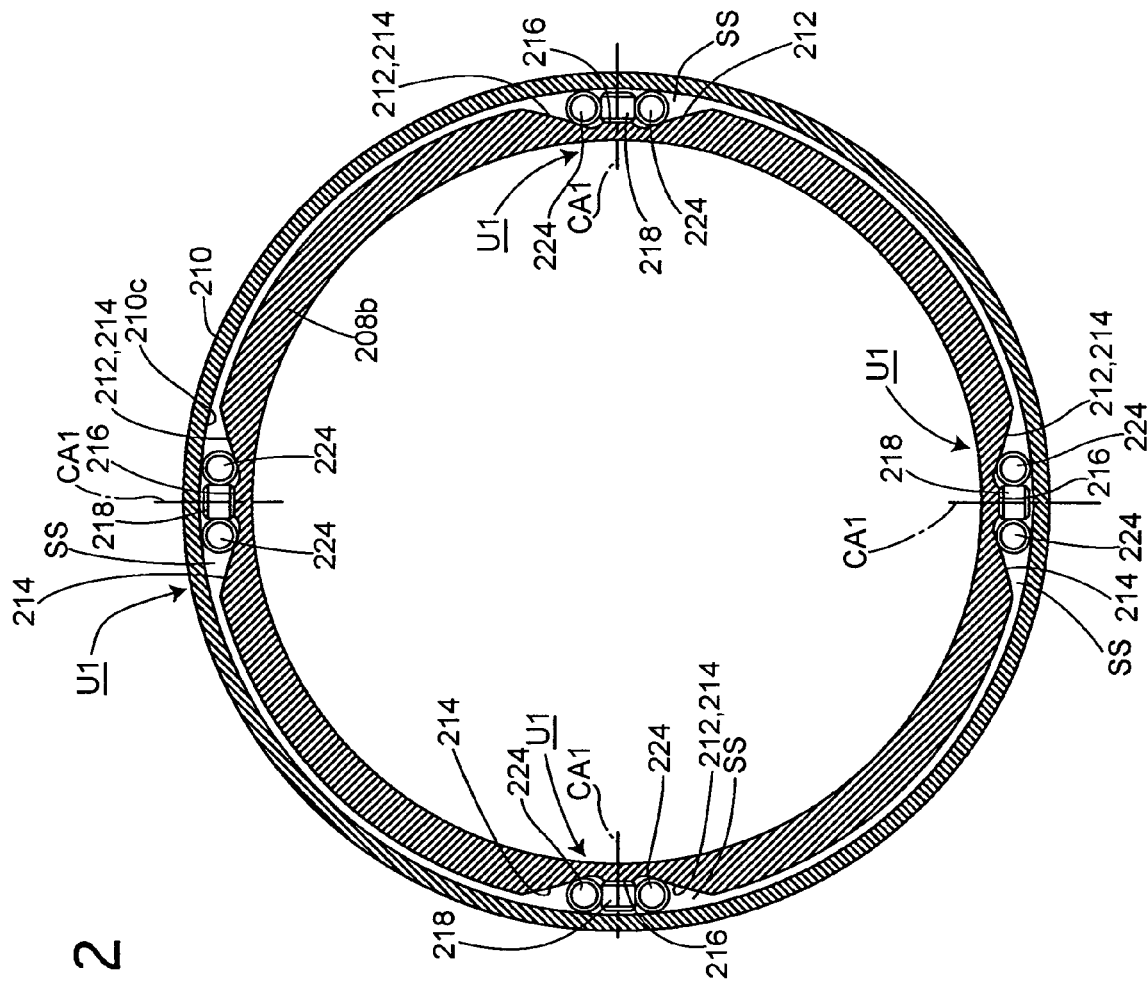
FIG. 2 is a cross sectional view taken along II—II line in FIG. 1, in which a lens holder ring, a movable ring and a focusing lens group are not shown.
Figure 3:
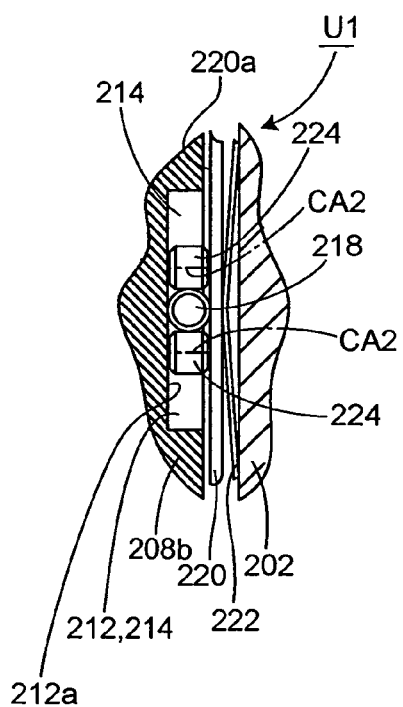
FIG. 3 is a sectional view of a portion of a first one-way rotational transfer mechanism incorporated in the lens barrel shown in FIG. 1, viewed from the outside of an annular projecting portion of a manual focus ring.
Figure 4:
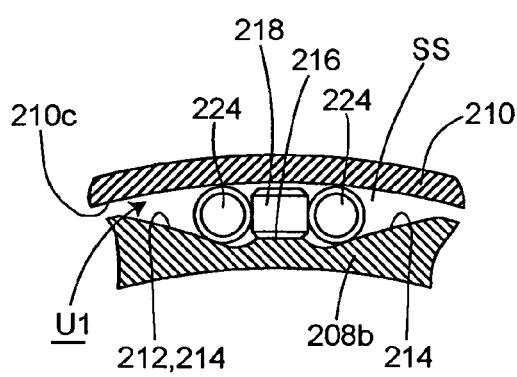
FIG. 4 is a cross sectional view of a portion of the first one-way rotational transfer mechanism.
Figure 5:
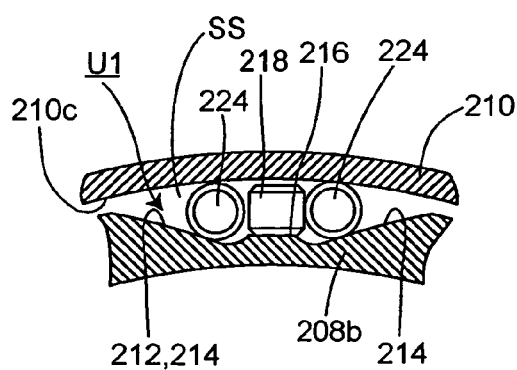
FIG. 5 is a view similar to that of FIG. 4, showing the same portion of the first one-way rotational transfer mechanism when the manual focus ring is rotated.

As shown in FIG. 2, the annular projection 208b of the manual focus ring 208 is provided on an outer peripheral surface thereof at equi-angular intervals in a circumferential direction with a set of four accommodation recesses (first circumferentially-uneven-width spaces/accommodation spaces SS) 212 which are recessed radially inwards. Each accommodation recess 212 is formed by a pair of circumferentially-uneven-depth grooves (first circumferentially-uneven-width-space forming portions/first uneven-depth grooves) 214 which have different radial depths at different circumferential positions, and a flat portion (first circumferentially-uneven-width-space forming portion) 216 formed between each pair of circumferentially-uneven-depth grooves 214. As shown in FIG. 3, an inner front surface in each accommodation recess 212 is formed as an axially-orthogonal surface (first orthogonal surface) 212a which lies in a plane orthogonal to the optical axis O. An accommodation space (circumferentially-uneven-width space) SS having different shapes at different circumferential positions is formed between the inner peripheral surface 210c of the distance adjustment ring 210 and each accommodation recess 212 (which is formed by one pair of circumferentially-uneven-depth grooves 214 and the associated flat portion 216).

As shown in FIGS. 2 through 5, a differential roller (first differential rotating member) 218 is installed between each flat portion 216 and the inner peripheral surface 210c of the distance adjustment ring 210 so that an axis (axis of rotation) CA1 of the differential roller 218 extends in a radial direction of the manual focus ring 208. As shown in FIG. 3, an annular flat member (first pressing member) 220 which is seen as a ring shape as viewed from the front thereof is fitted on a rear portion of the lens holder ring 204 and positioned in an annular space between a front end surface of the second stationary ring 202 and a rear end of the annular projection 208b, while an annular leaf spring (first biasing member) 222 which has a ring shape as viewed from the front thereof is fitted on the rear portion of the lens holder ring 204 and positioned in the aforementioned annular space between the annular flat member 220 and the front end surface of the second stationary ring 202. The annular leaf spring 222 continuously biases the annular flat member 220 forward so that a pressing surface (first pressing surface) 220a (which is parallel to the axially-orthogonal surface 212a) on the front of the annular flat member 220 remains in pressing contact with a rear surface of each differential roller 218 to bias each differential roller 218 forward, thus causing a front surface of each differential roller 218 to be continuously pressed against the axially-orthogonal surface 212a of the associated accommodation recess 212.

Additionally, a pair of engageable rollers (first torque transfer members) 224 are installed in each accommodation recess 212 (each accommodation space SS) on opposite sides of the associated differential roller 218 in a manner so as to hold the differential roller 218 between the pair of engageable rollers 224 and so that an axis CA2 (see FIG. 3) of each engageable roller 224 extends in a direction parallel to the optical axis O. The peripheral surface of each engageable roller 224 is freely rotatable while being in contact with the associated circumferentially-uneven-depth groove 214 and the inner peripheral surface 210c of the distance adjustment ring 210.

As shown in FIG. 1, the lens barrel 200 is provided, in an annular space (which has a ring shape as viewed from the front of the lens barrel 200) formed between the lens holder ring 204 and the annular wall 208a of the manual focus ring 208, with a ball retaining ring 226 so that the ball retaining ring 226 is freely rotatable about the optical axis O. The ball retaining ring 226 is provided at equi-angular intervals in a circumferential direction with a plurality of insertion holes 226a (only one of them is shown in FIG. 1). A ball 228 (like that of a ball bearing) is installed in each insertion hole 226a to be freely rotatable therein while remaining in contact with a front surface of the annular wall 208a and the lens holder ring 204.

The annular projection 208b of the manual focus ring 208, the inner peripheral surface 210c of the distance adjustment ring 210, the four accommodation recesses 212 (the axially-orthogonal surface 212a, the four pairs of circumferentiallyuneven-depth grooves 214 and the four flat portions 216), the differential rollers 218, the annular flat member 220, the annular leaf spring 222 and the four pairs of engageable rollers 224 are elements which constitute a one-way-rotational transfer mechanism (first one-way rotational transfer mechanism) U1.

The lens barrel 200 is provided with an AF switch (not shown) for enabling or disabling AF photography (i.e., for switching between AF mode and MF mode).

Operations of the lens barrel 200 having the above described structure will be discussed hereinafter.

Firstly, operations of the lens barrel 200 when a focusing operation is performed in manual focus mode will be hereinafter discussed.

First of all, when the AF switch is switched OFF to prohibit the AF motor M from rotating, if the manual focus ring 208 is manually rotated by the user counterclockwise as viewed from the front of the lens barrel 200, each differential roller 218, which is held between the pressing surface 220a of the annular flat member 220 and the axially-orthogonal surface 212a of the manual focus ring 208, revolves around the optical axis O in the same direction (counterclockwise direction) as the rotating direction of the manual focus ring 208 while rotating on the axis CA1 of the differential roller 218 in the associated accommodation recess 212. During this movement of each differential roller 218, provided that no slip occurs either between each differential roller 218 and the pressing surface 220a or between each differential roller 218 and the axially-orthogonal surface 212a, the revolving speed of each differential roller 218 around the optical axis O is half the rotational speed of the manual focus ring 208. As a result, each differential roller 218 revolves clockwise as viewed from the front thereof relative to the manual focus ring 208 (see FIG. 5). Therefore, each differential roller 218 comes in contact with one of the associated pair of engageable rollers 224 which is positioned on the clockwise side as viewed from the front thereof, and subsequently biases this engageable roller 224 so that it rotates clockwise. This engageable roller 224 rotates clockwise in the associated accommodation space SS to firmly wedge into that one of the wedge-shape (radially-narrowed) circumferentially opposite ends of the associated accommodation space SS which is positioned on the clockwise side in the accommodation space SS between the associated circumferentially-uneven-depth groove 214 and the inner peripheral surface 210c of the distance adjustment ring 210. This causes the manual focus ring 208 and the distance adjustment ring 210 to become integral with each other circumferentially via the wedged engageable rollers 224 so that the rotation of the manual focus ring 208 is transferred to the distance adjustment ring 210 to rotate the distance adjustment ring 210 counterclockwise. Thereupon, this counterclockwise rotation of the distance adjustment ring 210 causes the focusing lens group L2 to move forward along the optical axis O.

On the other hand, if the manual focus ring 208 is manually rotated by the user clockwise as viewed from the front of the lens barrel 200, each differential roller 218, which is held between the pressing surface 220a of the annular flat member 220 and the axially-orthogonal surface 212a of the manual focus ring 208, revolves around the optical axis O in the same direction (clockwise direction) as the rotating direction of the manual focus ring 208 while rotating about the axis CA1 of the differential roller 218 in the associated accommodation recess 212. During this movement of each differential roller 218, provided that no slip occurs either-between each differential roller 218 and the pressing surface 220a or between each differential roller 218 and the axially-orthogonal surface 212a, the revolving speed of each differential roller 218 around the optical axis O is half the rotational speed of the manual focus ring 208. As a result, each differential roller 218 revolves counterclockwise as viewed from the front thereof relative to the manual focus ring 208. Therefore, each differential roller 218 comes in contact with one of the associated pair of engageable rollers 224 which is positioned on the counterclockwise side as viewed from the front thereof, and subsequently biases this engageable roller 224 so that it rotates counterclockwise. This engageable roller 224 rotates counterclockwise in the associated accommodation space SS to firmly wedge into the other of the wedge-shape (radially-narrowed) circumferentially opposite ends of the associated accommodation space SS, which is positioned on the counterclockwise side in the accommodation space SS between the associated circumferentially-uneven-depth groove 214 and the inner peripheral surface 210c of the distance adjustment ring 210. This causes the manual focus ring 208 and the distance adjustment ring 210 to become integral with each other circumferentially via the wedged engageable rollers 224 so that the rotation of the manual focus ring 208 is transferred to the distance adjustment ring 210 to rotate the distance adjustment ring 210 clockwise. Thereupon, this clockwise rotation of the distance adjustment ring 210 causes the focusing lens group L2 to move rearward along the optical axis O.

Operations of the lens barrel 200 when a focusing operation is performed in autofocus mode will be hereinafter discussed.

In this case, firstly the aforementioned AF switch is switched ON to select AF mode, in which an autofocusing operation can be performed. Immediately after a control circuit (not shown) provided in the camera body outputs a forward-rotation drive signal to the AF motor M to rotate the AF motor M in a forward direction, a forward rotation of the AF motor M is transferred to the distance adjustment ring 210 via the engagement of the pinion P with the input gear 210a, so that the distance adjustment ring 210 rotates counterclockwise as viewed from the front thereof. Consequently, the focusing lens group L2 moves forward along the optical axis O.

At this time, even if the distance adjustment ring 210 rotates, a torque of the distance adjustment ring 210 is not transferred to any of the engageable rollers 218, thus not causing any engageable roller 224 to rotate (see FIG. 4) since the inner peripheral surface 210c of the distance adjustment ring 210 has a circular shape as viewed from the front thereof. Accordingly, the manual focus ring 208 does not rotate even if the distance adjustment ring 210 rotates.

On the other hand, if the control circuit in the camera body outputs a reverse-rotation drive signal to the AF motor M to rotate the AF motor M in reverse direction, a reverse rotation of the AF motor M is transferred to the distance adjustment ring 210 via the engagement of the pinion P with the input gear 210a, so that the distance adjustment ring 210 rotates clockwise as viewed from the front thereof. Consequently, the focusing lens group L2 moves rearward along the optical axis O.

At this time, similar to the case where the AF motor M rotates in forward direction, a torque of the distance adjustment ring 210 is not transferred to any of the engageable rollers 218 even if the distance adjustment ring 210 rotates, thus not causing any engageable roller 224 to rotate since the inner peripheral surface 210c of the distance adjustment ring 210 has a circular shape as viewed from the front thereof.

Accordingly, the manual focus ring 208 does not rotate even if the distance adjustment ring 210 rotates.

In this manner the control circuit makes the AF motor M rotate in forward and reverse directions to move the focusing lens group L2 forward and rearward to perform an autofocusing operation.

As has been described above, according to the above illustrated first embodiment of the lens barrel 200, MF photography becomes possible if the MF mode is selected by switching OFF the AF switch, while AF photography becomes possible if the AF mode is selected by switching ON the AF switch. Moreover, the autofocusing operation is performed smoothly even if the user touches the manual focus ring with his/her hand during the autofocusing operation since the manual focus ring 208 does not rotate during the autofocusing operation. Furthermore, a manual focusing operation can be performed smoothly by operating the manual focus ring 208 because the manual focus ring 208 does not undergo any torque which may become a resistance to rotation of the manual focus ring 208.

In addition, the first one-way rotational transfer mechanism U1 is constructed so that a torque of the manual focus ring 208 can be securely transferred to the distance adjustment ring 210 because each differential roller 218 is made to revolve around the manual focus ring 208 in the same direction as the rotational direction of the manual focus ring 208 while revolving at a speed slower than the rotational speed of the manual focus ring 208, and because each engageable roller 224 is made to wedge firmly between the manual focus ring 208 and the distance adjustment ring 210 to serve as a torque transfer member. Consequently, MF photography can be reliably performed.

Furthermore, since each engageable roller 224 is formed as a cylindrical member, the axis CA2 of which being parallel to the optical axis O, each engageable roller 224 that serves as a torque transfer member is in contact with each of the manual focus ring 208 and the distance adjustment ring 210 on a contact area greater than that in the case where the torque transfer member is formed as a spherical member. Therefore, the efficiency of transferring torque from the manual focus ring 208 to the distance adjustment ring 210 in the present embodiment of the one-way rotational transfer mechanism U1 is higher than that in the case where each torque transfer member is formed in a spherical member.

Figure 6:
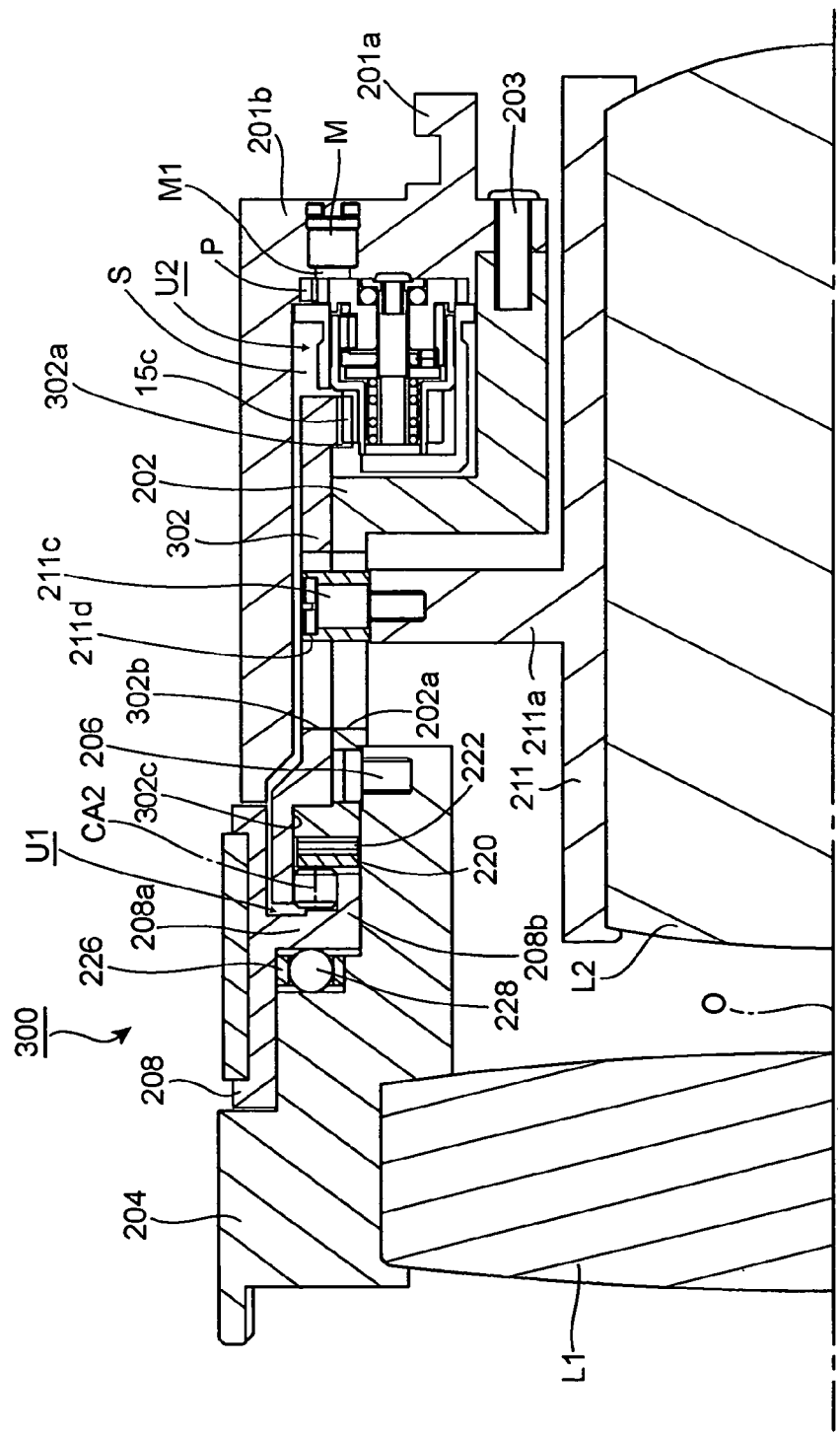
FIG. 6 is a longitudinal cross sectional view of an upper half of a second embodiment of the lens barrel from the optical axis thereof according to the present invention.
Figure 7:
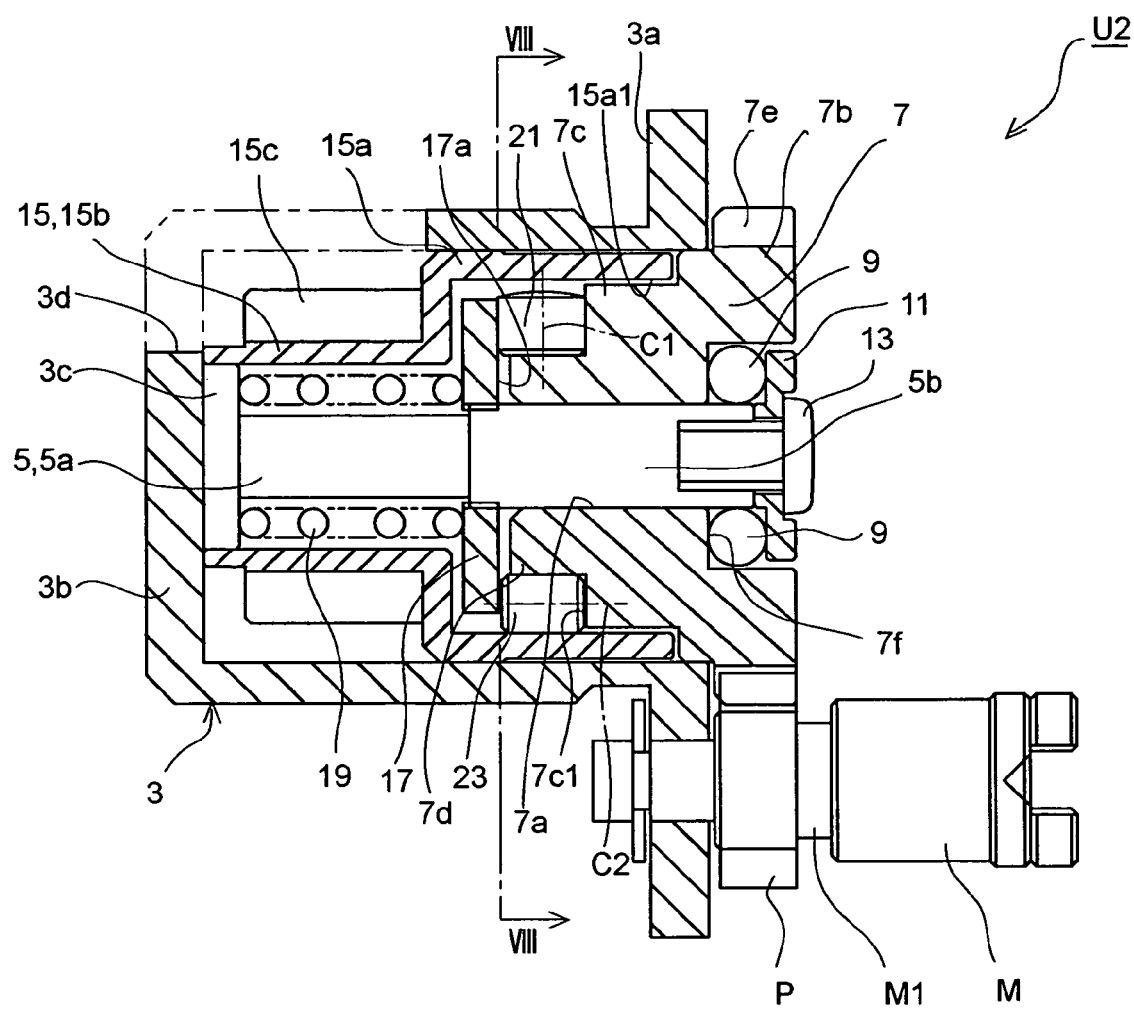
FIG. 7 is a longitudinal cross sectional view of a second one-way rotational transfer mechanism incorporated in the lens barrel shown in FIG. 6.
Figure 8:
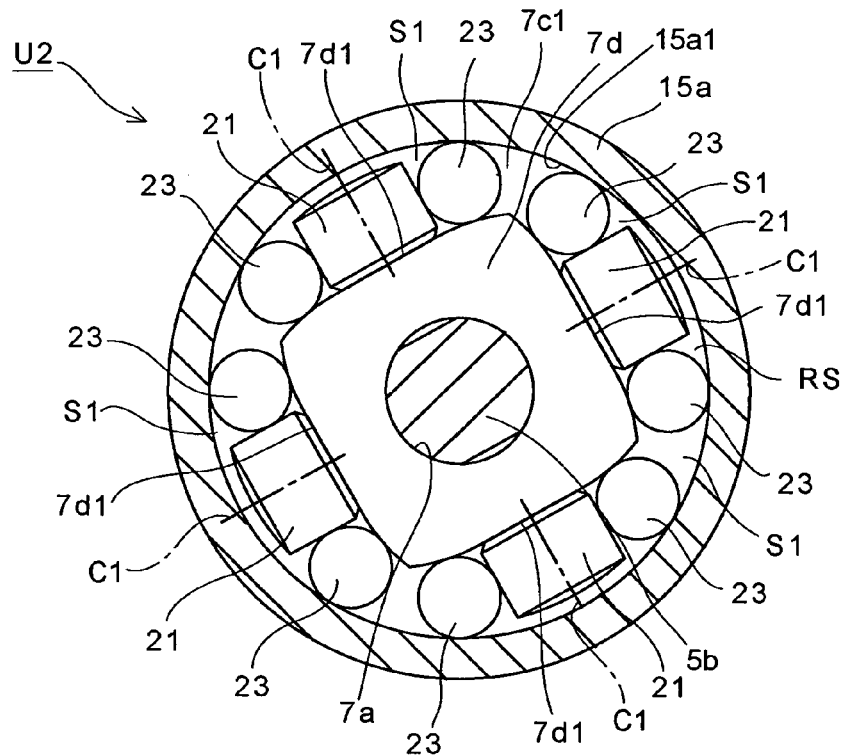
FIG. 8 is a cross sectional view taken along VIII—VIII line shown in FIG. 7.

FIGS. 6 through 8 show a second embodiment of the lens barrel according to the present invention. Elements and portions of this embodiment of the lens barrel 300 which are similar to those of the first embodiment of the lens barrel 200 are designated by the same reference numerals, and detailed descriptions of such similar elements and portions are omitted from the following descriptions.

The overall structure of the second embodiment of the lens barrel 300 is substantially identical to that of the first embodiment of the lens barrel 200 except that a distance adjustment ring 302 in the lens barrel 300 is slightly different in shape from the distance adjustment ring 210 in the lens barrel 200, and the lens barrel 300 is provided in the accommodation space S with a one-way rotational transfer mechanism (second one-way rotational transfer mechanism) U2 via which the pinion P and the distance adjustment ring 302 are associated with each other.

Such differences between the two lens barrels 200 and 300 will be discussed hereinafter.

The distance adjustment ring 302 in the second embodiment of the lens barrel is smaller in length (in the optical axis direction) than the distance adjustment ring 210 in the first embodiment of the lens barrel, and the distance between the rear end of the distance adjustment ring 302 and the rear wall 201b of the first stationary ring 201 is greater than the distance between the rear end of the distance adjustment ring 210 and the rear wall 201b of the first stationary ring 201. The distance adjustment ring 302 in the second embodiment of the lens barrel is provided with an input gear 302a and a set of three cam grooves 302b which correspond to the input gear 210a and the set of three cam grooves 210b, respectively. An inner peripheral surface (first torque transfer cylindrical surface) 302c of a front end portion of the distance adjustment ring 302 has a circular shape as viewed from the front thereof and has a central axis which is coincident with the optical axis O.

The structure of the one-way rotational transfer mechanism U2 will be hereinafter discussed in detail with reference mainly to FIGS. 7 and 8.

The one-way rotational transfer mechanism U2 is provided with a cylindrical housing 3 whose front and rear ends are formed as a closed end and an open end, respectively. The cylindrical housing 3 is provided at a rear end thereof with an annular flange 3a which is fixed to the first stationary ring 201 by set screws (not shown). The cylindrical housing 3 is provided at a front end thereof with a front wall 3b, and a disc plate 3c is fixed to a rear surface of the front wall 3b at the center thereof. The one-way rotational transfer mechanism U2 is provided radially inside the housing 3 with a rotational shaft (stationary shaft) 5 which is positioned coaxially with the axis of the housing 3. A front surface of the rotational shaft 5 is fixed to a rear surface of the disc plate 3c. The rotational shaft 5 consists of a front small-diameter portion 5a and a rear large-diameter portion 5b. The axial direction of the rotational shaft 5 is parallel to the optical axis O.

The one-way rotational transfer mechanism U2 is provided on the large-diameter portion 5b of the rotational shaft 5 with a hollow-cylindrical rotary input shaft 7 having a central hole 7a so that the rotary input shaft 7 is freely rotatable on the large-diameter portion 5b of the rotational shaft 5. As shown in FIG. 7, the rotary input shaft 7 is formed so that a diameter thereof increases in three steps in a direction toward the rear of the rotary input shaft 7. Specifically, the rotary input shaft 7 is provided with a large-diameter portion 7b, an intermediate-diameter portion 7c and a small-diameter portion (second circumferentially-uneven-width-space forming portion/portion having a non-circular cross section) 7d in that order from the rear end to the front end of the rotary input shaft 7 so that a front surface of the intermediate-diameter portion 7c is formed as an axially-orthogonal surface 7c1 (second orthogonal surface; viewed as an annular surface from the front of the rotary input shaft 7) which lies in a plane orthogonal to the axis of the rotary input shaft (rotational shaft 5). Each of the large-diameter portion 7b and the intermediate-diameter portion 7c has a circular cross section, whereas the small-diameter portion 7d has a substantially square cross section as shown in FIG. 8. The large-diameter portion 7b is provided on an outer peripheral surface thereof with an input gear 7e.

A front portion of the rotary input shaft 7 in front of the input gear 7e is accommodated in the housing 3. The rotary input shaft 7 is provided, on a rear end surface thereof at the center of this rear end surface, with an annular recess 7f, while a plurality of steel balls 9 for ball bearing are positioned circumferentially in the annular recess 7f. A stop ring 11 having a diameter substantially the same as the diameter of the annular recess 7f is fixed to the rear end surface of the rotational shaft 5 by a set screw 13 to prevent the rotary input shaft 7 from moving rearward beyond the position thereof shown in FIG. 7 by engagement of each steel ball 9 with the stop ring 11.

A reversible AF motor M is fixed to the annular flange 3a of the housing 3 so that the pinion P fixed on the rotary shaft M1 of the AF motor M is in mesh with the input gear 7e of the rotary input shaft 7.

The one-way rotational transfer mechanism U2 is provided inside the housing 3 with a hollow-cylindrical rotary output shaft 15 whose front and rear ends are each formed as an open end. The rotary output shaft 15 is rotatable about the rotational shaft 5. The rotary output shaft 15 is formed so that a diameter thereof increases in two steps in a direction toward the rear of the rotary output shaft 15. Specifically, the rotary output shaft 15 is provided with a large-diameter portion 15a and a small-diameter portion 15b, in that order from the rear end to the front end of the rotary output shaft 15. A rear end portion of the large-diameter portion 15a is fitted in the annular space formed between an inner peripheral surface of the housing 3 and an outer peripheral surface of the intermediate-diameter portion 7c of the rotary input shaft 7 so that the large-diameter portion 15a is rotatable about the rotational shaft 5, while a front end portion of the small-diameter portion 15b is fitted on an outer peripheral surface of the disc plate 3c so that the small-diameter portion 15b is rotatable on the disc plate 3c. The small-diameter portion 15b is provided on its entire outer peripheral surface with an output gear 15c which is exposed to the outside of the housing 3 via an opening 3d formed on a front end portion of the housing 3. As shown in FIG. 6, the output gear 15c is in mesh with the input gear 302a of the distance adjustment ring 302.

An annular member (second pressing member) 17 is fitted on the rear large-diameter portion 5b of the rotational shaft 5 to be positioned in front of the rotary input shaft 7. A compression coil spring (second biasing device) 19 is installed in a compressed state between a front surface of the annular member 17 and a rear surface of the disc plate 3c. The annular member 17 is continuously biased rearward by the spring force of the compression coil spring 19.

As shown in FIG. 8, an accommodation space (second circumferentially-uneven-width space) S1 having different radial widths at different circumferential positions is formed between an inner peripheral surface (second torque transfer cylindrical surface) 15a1 of the large-diameter portion 15a and each of four side surfaces (accommodation-space forming surfaces) 7d1 of the small-diameter portion 7d. In other words, an annular space RS which is formed between the small-diameter portion 7d and the inner peripheral surface 15a1 of the large-diameter portion 15a, as viewed from the front of the one-way rotational transfer mechanism U2 is divided into four to form the four accommodation spaces S1.

A differential roller (second differential rotating member) 21 having a substantially columnar shape is installed in each of the four accommodation spaces S1 so that an axis (axis of rotation) C1 of the differential roller 21 extends in a radial direction of the rotary input shaft 7. Each differential roller 21 is loosely fitted in between the associated side surface 7d1 and the inner peripheral surface 15a1, while the axially-orthogonal surface 7c1 of the rotary input shaft 7 and a pressing surface (second pressing surface) 17a, which lies on a plane orthogonal to the axis of the rotational shaft 5, serving as a rear surface of the annular member 17 are in contact with peripheral surfaces of each differential roller 21 at opposite sides thereof so that the differential roller 21 is held between the axially-orthogonal surface 7c1 and the pressing surface 17a.

Additionally, a pair of engageable rollers (second torque transfer members) 23 are installed in each accommodation space S1 on opposite sides of the associated differential roller 21 as viewed from the front of the one-way rotational transfer mechanism U2 in a manner so as to hold the differential roller 21 between the pair of engageable rollers 23. Each engageable roller 23 has a substantially columnar shape, and an axis (axis of rotation) C2 of each engageable roller 23 extends in a direction parallel to the axis of the rotational shaft 5. Each engageable roller 23 is movable in the associated accommodation space S1 in a circumferential direction about the axis of the rotational shaft 5. In addition, each engageable roller 23 is movable in the direction of the axis C2 with respect to the annular member 17 and the rotary input shaft 7 because the length of each engageable roller 23 in the direction of the axis C2 thereof is shorter than the diameter of each differential roller 21 about the axis C1 and because each engageable roller 23 does not undergo any biasing force from the annular member 17.

Similar to the lens barrel 200, the lens barrel 300 is provided with an AF switch (not shown) for enabling or disabling AF photography (i.e., for switching between AF mode and MF mode).

Operations of the lens barrel 300 having the above described structure will be discussed hereinafter.

Firstly, operations of the lens barrel 300 when a focusing operation is performed in autofocus mode will be hereinafter discussed.

The aforementioned AF switch is switched ON beforehand so that the lens barrel 300 can perform an autofocusing operation.

Immediately after a control circuit (not shown) provided in the camera body outputs a forward-rotation drive signal to the AF motor M to rotate the AF motor M in a forward direction, a forward rotation of the AF motor M is transferred to the rotary input shaft 7 via the engagement of the pinion P with the input gear 7e, so that the rotary input shaft 7 rotates counterclockwise as viewed in FIG. 8. Thereupon, each differential roller 21 that is held between the pressing surface 17a of the annular member 17 and the axially-orthogonal surface 7c1 of the rotary input shaft 7 revolves (rotates) around the axis of the rotary input shaft 7 in the same rotational direction (counterclockwise direction) as the rotary input shaft 7 while rotating about the axis C1 of the differential roller 21 in the associated accommodation space S1. During this movement of each differential roller 21, provided that no slip occurs either between each differential roller 21 and the pressing surface 17a or between each differential roller 21 and the axially-orthogonal surface 7c1, the rotational speed of each differential roller 21 around the axis of the rotary input shaft 7 is half the rotational speed of the rotary input shaft 7. As a result, each differential roller 21 rotates clockwise relative to the rotary input shaft 7. Therefore, each differential roller 21 comes in contact with one of the associated pair of engageable rollers 23 which is positioned on the clockwise side, and subsequently biases this engageable roller 23 so that it rotates clockwise. This engageable roller 23 rotates clockwise in the associated accommodation space S1 to firmly wedge into one of the wedge-shaped (radially-narrowed) circumferentially opposite end portions of the associated accommodation space S1 which is positioned on the clockwise side in the accommodation space S1 between the associated side surface 7d1 of the small-diameter portion 7d and the inner peripheral surface 15a1 of the large-diameter portion 15a. This causes the small-diameter portion 7d (the rotary input shaft 7) and the rotary output shaft 15 to become integral with each other circumferentially via the wedged engageable rollers 23 so that the rotation of the small-diameter portion 7d is transferred to the rotary output shaft 15 to rotate the rotary output shaft 15 counterclockwise. Thereupon, this rotation of the rotary output shaft 15 is transferred to the input gear 302a via the output gear 15c to rotate the distance adjustment ring 302 counterclockwise as viewed from the front thereof, thus causing the focusing lens group L2 to move forward along the optical axis O.

Even if the distance adjustment ring 302 rotates in such a manner, no torque is transferred from the distance adjustment ring 302 to any of the four differential rollers 218, so that the manual focus ring 208 does not rotate in a similar fashion to the first embodiment of the lens barrel since the inner peripheral surface 302c of the distance adjustment ring 302 has a circular shape as viewed from the front thereof.

On the other hand, if the control circuit in the camera body outputs a reverse-rotation drive signal to the AF motor M to rotate the AF motor M in reverse direction, a reverse rotation of the AF motor M is transferred to the rotary input shaft 7 via the engagement of the pinion P with the input gear 7e, so that the rotary input shaft 7 rotates clockwise as viewed in FIG. 8. Thereupon, each differential roller 21 revolves (rotates) around the axis of the rotary input shaft 7 in the same rotational direction (clockwise direction) as the rotary input shaft 7 at a rotational speed half the rotational speed of the rotary input shaft 7 while rotating on the axis C1 of the differential roller 21. As a result, each differential roller 21 revolves counterclockwise relative to the rotary input shaft 7. Therefore, each differential roller 21 comes in contact with the other of the associated pair of engageable rollers 23 that is positioned on the counterclockwise side, and subsequently biases this engageable roller 23 so that it rotates counterclockwise. This engageable roller 23 rotates counterclockwise in the associated accommodation space S1 to firmly wedge into the other of the wedge-shaped (radially-narrowed) circumferentially opposite end portions of the associated accommodation space S1, which is positioned on the counterclockwise side in associated accommodation space S1 between the associated side surface 7d1 of the small-diameter portion 7d and the inner peripheral surface 15a1 of the large-diameter portion 15a. This causes the small-diameter portion 7d (the rotary input shaft 7) and the rotary output shaft 15 to become integral with each other circumferentially via the wedged engageable rollers 23, so that the rotation of the small-diameter portion 7d is transferred to the rotary output shaft 15 to rotate the rotary output shaft 15 clockwise. Thereupon, this rotation of the rotary output shaft 15 is transferred to the input gear 302a via the output gear 15c to rotate the distance adjustment ring 302 clockwise as viewed from the front thereof, thus causing the focusing lens group L2 to move rearward along the optical axis O.

As in the case where the AF motor M rotates in a forward direction, even if the distance adjustment ring 302 rotates in such a manner, no torque is transferred from the inner peripheral surface 302c of the distance adjustment ring 302 to any of the four differential rollers 218 so that the manual focus ring 208 does not rotate. In this manner the control circuit makes the AF motor M rotate in forward and reverse directions to move the focusing lens group L2 forward and rearward to perform an autofocusing operation.

Immediately after an in-focus state is obtained by the autofocusing operation, the control circuit sends a control signal to the AF motor M to rotate the AF motor M in a rotational direction opposite to the previous rotational direction of the AF motor M by an angle of rotation smaller than backlash between the pinion P and the input gear 7e. Thereupon, the rotary input shaft 7 rotates in a rotational direction opposite to the previous rotational direction, in which the rotary input shaft 7 rotates immediately before the aforementioned in-focus state is obtained, without rotating the rotary output shaft 15 to thereby reduce the contacting force of each engageable roller 23 with each of the associated side surface 7d1 of the small-diameter portion 7d and the inner peripheral surface 15a1 of the large-diameter portion 15a. This reduction of such a contacting force allows the manual focus ring 208 of the lens barrel 300 to be rotated smoothly.

Operations of the lens barrel 300 when a focusing operation is performed in manual focus mode will be hereinafter discussed.

In a state where the AF switch is ON, if the manual focus ring 208 of the lens barrel 300 is manually rotated in a forward or reverse rotational direction with no actuation of the AF motor M, this forward or reverse rotation of the manual focus ring 208 is transferred to the distance adjustment ring 302 in the same fashion as the first embodiment of the lens barrel, thus causing the movable ring 211 and the focusing lens group L2 to move forward or rearward along the optical axis O to perform a focusing operation (MF operation).

Upon the rotation of the distance adjustment ring 302, torque of the distance adjustment ring 302 is transferred to the output gear 15c of the rotary output shaft 15 via the input gear 302a. Thereafter, the rotary output shaft 15 rotates clockwise or counterclockwise about the rotational shaft 5, whereas no torque is transferred from the rotary output shaft 15 to either each engageable roller 23 or each differential roller 21 since the inner peripheral surface (second torque transfer cylindrical surface) 15a1 of the rotary output shaft 15 has a circular shape as viewed from the front thereof. Therefore, rotation of the rotary output shaft 15 does not cause the small-diameter portion 7d (the rotary input shaft 7) to rotate, so that the rotary shaft M1 of the AF motor M does not rotate. Accordingly, the AF motor M does not apply any resistance to rotation of the manual focus ring 208, which makes a smooth manual focusing operation possible.

As can be understood from the above description, according to the present embodiment of the lens barrel 300, not only effects similar to those obtained in the first embodiment of the lens barrel 200 are obtained but also a manual focusing operation can be performed smoothly with the AF switch remained ON, i.e., without switching the AF switch OFF, since no torque of the manual focus ring 208 is transferred to the AF motor M even if the manual focus ring 208 is manually rotated.

A torque can be reliably transferred from the rotary input shaft 7 to the rotary output shaft 15 because each differential roller 21 is made to revolve (rotate) around the rotary input shaft 7 in the same rotational direction as the rotary input shaft 7 while trailing behind the rotation of the rotary input shaft 7 and because each engageable roller 23 is subsequently made to wedge firmly between the associated side surface 7d1 of the small-diameter portion 7d and the inner peripheral surface 15a1 of the large-diameter portion 15a to serve as a torque transfer member. Consequently, an autofocusing operation can be performed with reliability.

Moreover, since each engageable roller 23 is formed as a cylindrical member the axis C2 of which is parallel to the axis of the rotational shaft 5, each engageable roller 23 that serves as a second torque transfer member is in contact with each of the rotary input shaft 7 and the rotary output shaft 15 on a contact area greater than that in the case where the second torque transfer member is formed in a spherical member. Therefore, the efficiency of transferring torque from the rotary input shaft 7 to the rotary output shaft 15 in the present embodiment of the lens barrel 300 is higher than that in the case where each second torque transfer member is formed in a spherical member.

The number of the differential rollers 21 or the engageable rollers 23 which are accommodated in each accommodation space S1 can be changed by changing a cross sectional shape of the small-diameter portion 7d to a regular polygonal shape other than a square shape such as a regular triangular shape or a regular pentagonal shape, or by forming the small-diameter portion 7d to have a non-circular cross section so as to include at least one surface orthogonal to a radial direction of the rotary input shaft 7. With a change in the number of the differential rollers 21 or the engageable rollers 23, the efficiency of transferring torque from the rotary input shaft 7 to the rotary output shaft 15 can be adjusted.

The first through third modifications of the second one-way rotational transfer mechanism incorporated in the above described second embodiment of the lens barrel 300 will be discussed hereinafter. In the following descriptions, elements and portions which are similar to those of the second one-way rotational transfer mechanism U2 are designated by the same reference numerals.

Figure 9:
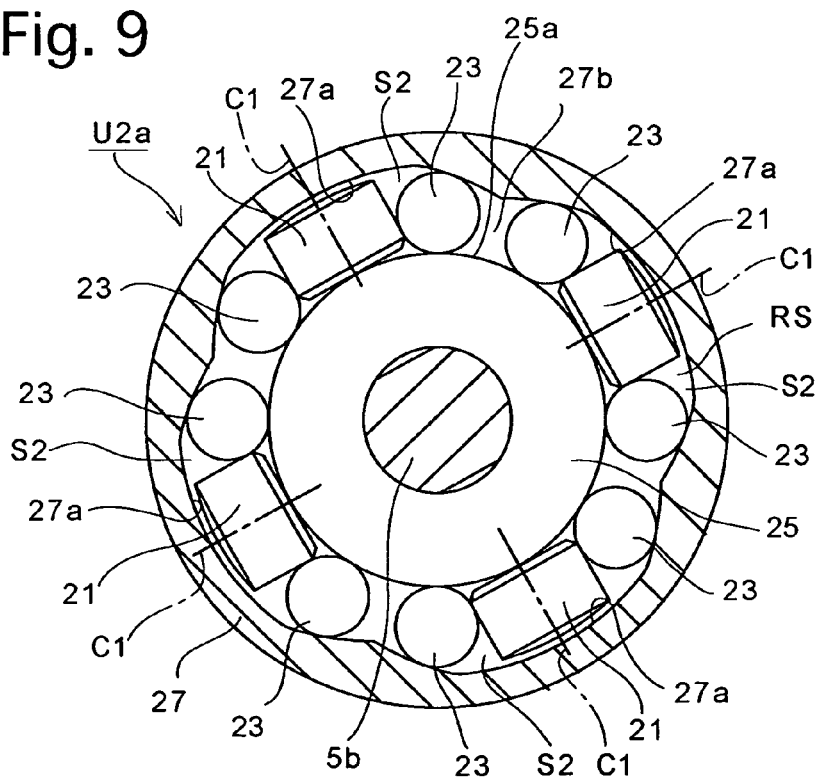
FIG. 9 is a view similar to that of FIG. 8, showing a first modification of the second one-way rotational transfer mechanism.

FIG. 9 shows a first modification of the second one-way rotational transfer mechanism, in which a rotary input shaft and a rotary output shaft are positioned in a radially reversed fashion; namely, a hollow-cylindrical rotary input shaft 27 is positioned radially outside a hollow-cylindrical rotary output shaft 25.

In the first modification U2a of the second one-way rotational transfer mechanism shown in FIG. 9, the rotary output shaft 25 is rotatably fitted on the large-diameter portion 5b of the rotational shaft 5, while the rotary input shaft 27 is positioned radially outside the rotary output shaft 25 to be rotatable about the axis of the rotational shaft 5. The rotary input shaft 27 is provided, on an inner peripheral surface thereof at equi-angular intervals in a circumferential direction of the rotary input shaft 27, with four circumferentially-uneven-depth grooves (second circumferentially-uneven-width-space forming portions/second circumferentially-uneven-depth grooves) 27a which have different radial depths at different circumferential positions. The first modification U2a of the second one-way rotational transfer mechanism is provided between each circumferentially-uneven-depth groove 27a and an outer peripheral surface (second torque transfer cylindrical surface) 25a of the rotary output shaft 25 (the central axis of the outer peripheral surface 25a being coincident with the axis of the rotary output shaft 25) with an accommodation space (second circumferentially-uneven-width space) S2 having different radial widths at different circumferential positions. In other words, an annular space RS which is formed between the rotary output shaft 25 and the rotary input shaft 27 is divided into four to form the four accommodation spaces S2.

The rotary input shaft 27 is provided with an axially-orthogonal surface (second orthogonal surface) 27b which lies in a plane orthogonal to the axis of the rotational shaft 5. Similar to the one-way rotational transfer mechanism U2, the annular member 17 that is continuously biased rearward by the spring force of the compression coil spring 19 is fitted on the rear large-diameter portion 5b to be positioned in front of the four accommodation spaces S2 (neither the annular member 17 nor the compression coil spring 19 is shown in FIG. 9). As shown in FIG. 9, a differential roller 21 is installed in each of the four accommodation spaces S2 to be held between the pressing surface 17a of the annular member 17 and the axially-orthogonal surface 27b of the rotary input shaft 27 at all times. Additionally, a pair of engageable rollers 23 are installed in each accommodation space S2 on opposite sides of the associated differential roller 21 to be movable in the associated accommodation space S2 in a circumferential direction about the axis of the rotational shaft 5 while holding the differential roller 21 between the pair of engageable rollers 23.

The rotary input shaft 27 is provided with an input gear (not shown) which is in mesh with the pinion P of the AF motor M, while the rotary output shaft 25 is provided with an output gear (not shown) which is in mesh with the input gear 302a of the distance adjustment ring 302.

Immediately after the control circuit in the camera body outputs a forward-rotation drive signal or a reverse-rotation drive signal to the AF motor M to rotate the AF motor M in forward or reverse direction, the rotary input shaft 27 rotates clockwise or counterclockwise as viewed in FIG. 9. Thereupon, each differential roller 21 revolves (rotates) around the axis of the rotary input shaft 27 in the same rotational direction as the rotary input shaft 27 at a rotational speed half the rotational speed of the rotary input shaft 27 while rotating on the axis C1 of the differential roller 21 in the associated accommodation space S1 to press one of the associated pair of engageable rollers 23 clockwise or counterclockwise which is positioned on the side opposite to the rotational direction of the rotary input shaft 27. This engageable roller 23 which is pressed to rotate clockwise or counterclockwise rotates in the associated accommodation space S2 to firmly wedge into one of the wedge-shaped (radially-narrowed) circumferentially opposite end portions of the associated accommodation space S2 between the associated circumferentially-uneven-depth groove 27a of the rotary input shaft 27 and the outer peripheral surface 25a of the rotary output shaft 25. As a result, the rotation of the rotary input shaft 27 is transferred to the rotary output shaft 25 via each engageable roller 23 to rotate the rotary output shaft 25 in the same rotational direction as the rotary input shaft 27 to perform an autofocusing operation.

Similar to the above described second one-way rotational transfer mechanism U2, immediately after an in-focus state is obtained by the autofocusing operation, the control circuit sends a control signal to the AF motor M to rotate the AF motor M in a rotational direction opposite to the previous rotational direction of the AF motor M for the autofocusing operation by an angle of rotation smaller than backlash between the pinion P and the input gear of the rotary input shaft 27 in the first modification U2a of the second one-way rotational transfer mechanism. Thereupon, the rotary input shaft 27 rotates in a rotational direction opposite to the previous rotational direction, in which the rotary input shaft 27 rotates immediately before the aforementioned in-focus state is obtained, without rotating the rotary output shaft 25 to thereby reduce the contacting force of each engageable roller 23 with each of the rotary input shaft 27 and the rotary output shaft 25. This reduction of such a contacting force allows the manual focus ring 208 of the lens barrel 300 to be rotated smoothly.

In a state shown in FIG. 9, rotating the manual focus ring 208 of the lens barrel 300 causes the rotary output shaft 25 to rotate clockwise or counterclockwise to perform a manual focusing operation. However, this rotation of the rotary output shaft 25 is not transferred to any of the engageable rollers 23 since the outer peripheral surface 25a of the rotary output shaft 25 has a circular shape as viewed from the front of the one-way rotational transfer mechanism U2a, so that rotating the manual focus ring 208 of the lens barrel 300 does not cause the rotary input shaft 27 to rotate. Consequently, the rotary shaft M1 of the AF motor M does not rotate.

Accordingly, effects similar to those obtained with the second one-way rotational transfer mechanism U2 can also be obtained with the first modification U2a of the second one-way rotational transfer mechanism.

Figure 10:
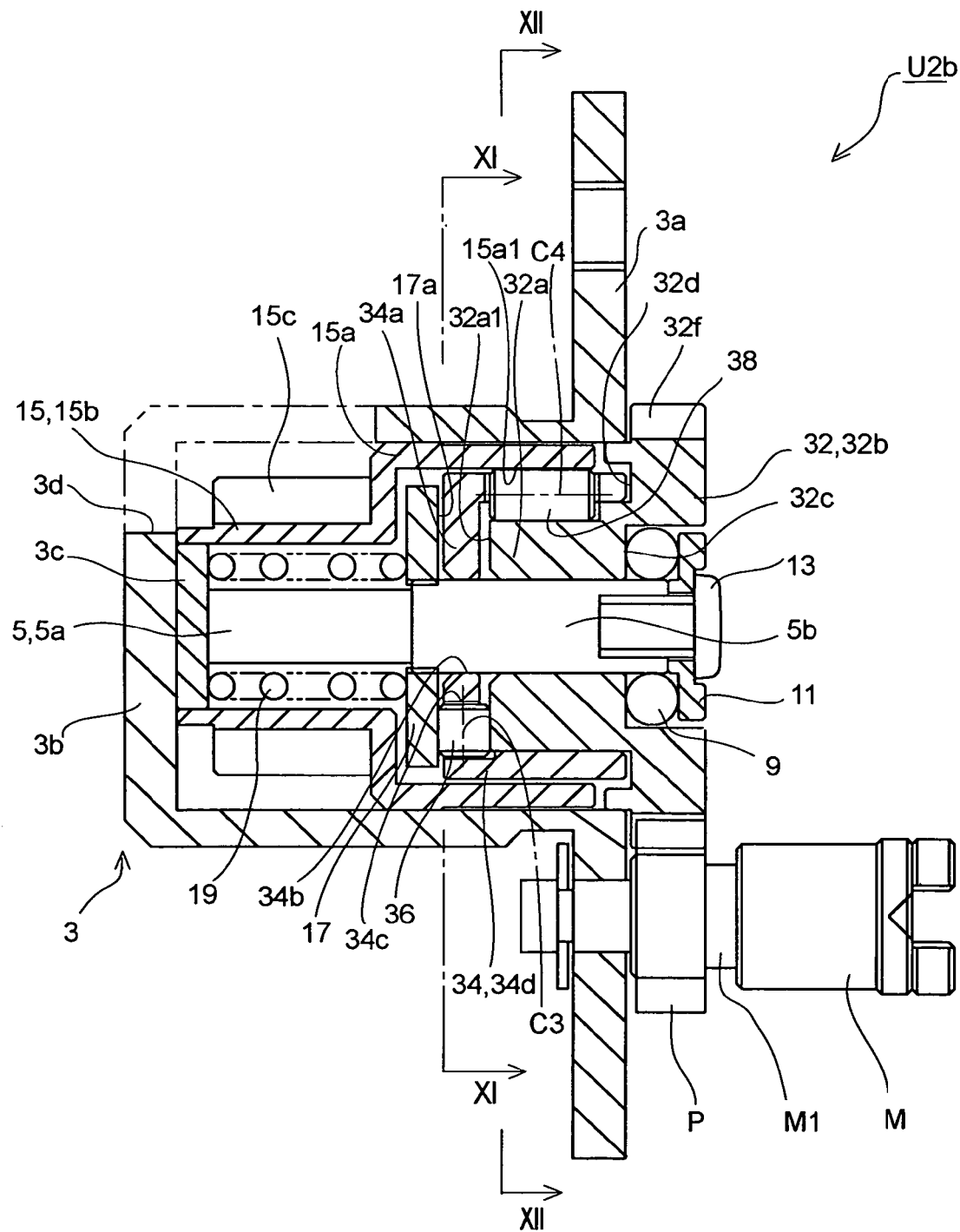
FIG. 10 is a longitudinal cross sectional view of a second modification of the second one-way rotational transfer mechanism.
Figure 11:
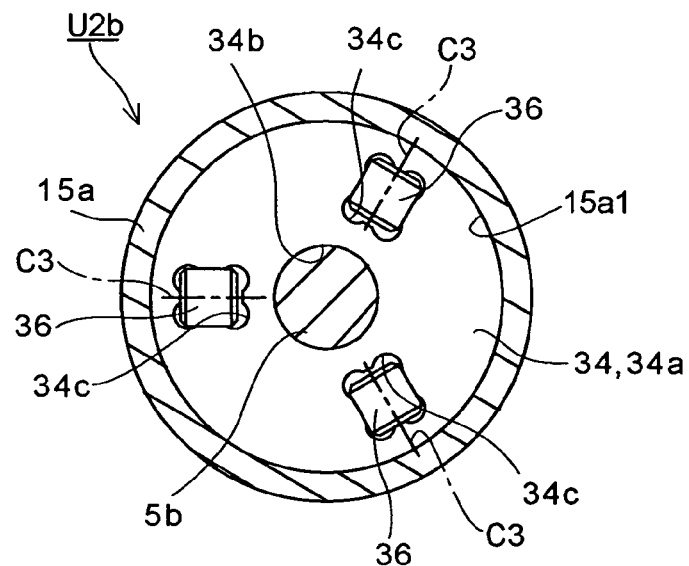
FIG. 11 is a cross sectional view taken along XI—XI line shown in FIG. 10.
Figure 12:
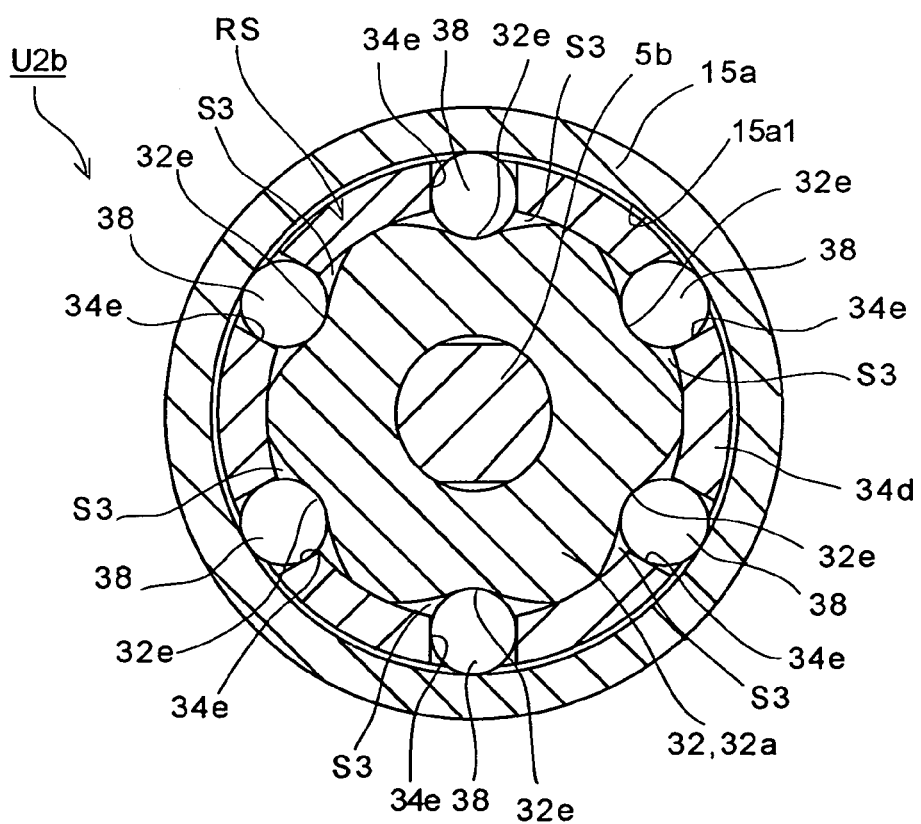
FIG. 12 is a cross sectional view taken along XII—XII line shown in FIG. 10.

FIGS. 10 through 12 show a second modification of the second one-way rotational transfer mechanism according to the present invention. The second modification U2b of the second one-way rotational transfer mechanism is provided on the large-diameter portion 5b of the rotational shaft 5 with a hollow-cylindrical rotary input shaft 32 having a small-diameter portion 32a at the front and a large-diameter portion 32b at the rear. The rotary input shaft 32 is provided on a rear surface of the large-diameter portion 32b with an annular recess 32c, and is further provided on an annular front surface of the large-diameter portion 32b with an annular engaging recess 32d (seen as an annular recess as viewed from the front of the rotary input shaft 32).

The large-diameter portion 32b of the rotary input shaft 32 is circular in cross section, while the small-diameter portion 32a of the rotary input shaft 32 is provided, on an outer peripheral surface thereof at equi-angular intervals in a circumferential direction of the rotary input shaft 32, with six circumferentially-uneven-depth grooves (second circumferentially-uneven-width-space forming portions/second circumferentially-uneven-depth grooves) 32e which have different radial depths at different circumferential positions as shown in FIG. 12. The one-way rotational transfer mechanism U2b is provided between each circumferentially-uneven-depth groove 32e and an inner peripheral surface (second torque transfer cylindrical surface) 15a1 of the large-diameter portion 15a of the rotary output shaft 15 with an accommodation space (second circumferentially-uneven-width space) S3 having different radial widths at different circumferential positions. In other words, an annular space RS which is formed between the rotary output shaft 15 and the rotary input shaft 32 is divided into six to form the six accommodation spaces S3. The rotary input shaft 32 is provided on an outer peripheral surface of the large-diameter portion 32b with an input gear 32f which is in mesh with the pinion P.

The one-way rotational transfer mechanism U2b is provided in the rotary output shaft 15 with a retainer 34. The rear end of the retainer 34 is formed as an open end. The retainer 34 is provided at a center of a front wall 34a of the retainer 34 with an insertion hole 34b in which the rotational shaft 5 is inserted. As shown in FIG. 11, the retainer 34 is provided, on the front wall 34a thereof at equi-angular intervals in a circumferential direction, with three fitting holes 34c. A differential roller (second differential rotating member) 36 having a substantially columnar shape is installed in each of the three fitting holes 34c so that the differential roller 36 is rotatable about an axis C3 thereof which extends in a radial direction of the rotary output shaft 15. The periphery of each differential roller 36 partly projects forward from a front surface of the front wall 34a of the retainer 34, and partly projects rearward from a rear surface of the front wall 34a of the retainer 34. As shown in FIG. 10, each differential roller 36 is held between the pressing surface 17a of the annular member 17 and an axially-orthogonal surface 32a1, which lies on a plane orthogonal to the axis of the rotary input shaft 32 (and rotational shaft 5) and is formed on a front surface of the rotary input shaft 32, since a front portion and a rear portion of the peripheral surface of each differential roller 36 are in contact with the pressing surface 17a of the annular member 17 and the annular surface 32a1 of the rotary input shaft 32, respectively.

As shown in FIG. 10, a cylindrical portion 34d of the retainer 34 is positioned in the annular space RS that is formed between the large-diameter portion 15a of the rotary output shaft 15 and the small-diameter portion 32a of the rotary input shaft 32. The cylindrical portion 34d is provided at equi-angular intervals in a circumferential direction with six insertion holes 34e. An engageable roller (second torque transfer member) 38 is installed in each insertion hole 34e with an axis (axis of rotation) C4 of the engageable roller 38 extending parallel to the axis of the rotational shaft 5, and each engageable roller 38 is rotatable on the axis C4 thereof and linearly movable freely along the axis C4 thereof.

Immediately after the control circuit that is provided in the camera body outputs a forward-rotation drive signal to the AF motor M to rotate the AF motor M in forward direction after the AF switch of the lens barrel 300 is switched ON, a forward rotation of the AF motor M is transferred to the rotary input shaft 32 via the engagement of the pinion P with the input gear 32f, so that the rotary input shaft 32 rotates counterclockwise as viewed in FIG. 12. Thereupon, each differential roller 36 that is held between the pressing surface 17a of the annular member 17 and the axially-orthogonal surface 32a1 of the rotary input shaft 32 revolves (rotates) around the axis of the rotary input shaft 32 in the same rotational direction (counterclockwise direction) as the rotary input shaft 32 at a rotational speed half the rotational speed of the rotary input shaft 32 while rotating on the axis C3 of the differential roller 36. As a result, the retainer 34 and each engageable roller 38, which rotate together with the three differential rollers 36 about the rotational axis 5, also revolve (rotate) around the axis of the rotary input shaft 32 clockwise relative to the rotary input shaft 32. Thereupon, each differential roller 38 firmly wedges into that one of the wedge-shape (radially-narrowed) circumferentially opposite end portions of the associated accommodation space S3 which is positioned on the clockwise side in the accommodation space S3 between one of the opposite end portions of the associated circumferentially-uneven-depth groove 32e which is positioned on the clockwise side and the inner peripheral surface 15a1 of the large-diameter portion 15a. This causes the small-diameter portion 32a (the rotary input shaft 32) and-the rotary output shaft 15 to become integral with each other circumferentially via the six engageable rollers 38, the retainer 34 and the three differential rollers 36, so that the rotation of the small-diameter portion 32a is transferred to the rotary output shaft 15 to rotate the rotary output shaft 15 counterclockwise. Thereupon, the rotation of the output gear 15c of the rotary output shaft 15 is transferred to the input gear 302a of the distance adjustment ring 302 to move the focusing lens group L2 forward along the optical axis O.

On the other hand, if the control circuit in the camera body outputs a reverse-rotation drive signal to the AF motor M to rotate the AF motor M in reverse direction, a reverse rotation of the AF motor M is transferred to the rotary input shaft 32 via the engagement of the pinion P with the input gear 32f, so that the rotary input shaft 32 rotates clockwise as viewed in FIG. 12. Thereupon, each differential roller 36 revolves (rotates) around the axis of the rotary input shaft 32 in the same rotational direction (clockwise direction) as the rotary input shaft 32 at a rotational speed half the rotational speed of the rotary input shaft 32, while each engageable roller 38 and the retainer 34 also revolve (rotate) clockwise around the axis of the rotary input shaft 32 counterclockwise relative to the rotary input shaft 32. As a result, each engageable roller 38 rotates counterclockwise in the associated accommodation space S3 to wedge into the other of the wedge-shape (radially-narrowed) circumferentially opposite end portions of the associated accommodation space S3, which is positioned on the counterclockwise side in the accommodation space S3 between the other of the opposite end portions of the associated circumferentially-uneven-depth groove 32e, positioned on the counterclockwise side and the inner peripheral surface 15a1 of the large-diameter portion 15a. This causes the small-diameter portion 32a (the rotary input shaft 32) and the rotary output shaft 15 to become circumferentially integral with each other via the six engageable rollers 38, the retainer 34 and the three differential rollers 36, thus causing the rotary output shaft 15 to rotate clockwise to thereby move the focusing lens group L2 rearward along the optical axis O.

In this manner the control circuit makes the AF motor M rotate in forward and reverse directions to move the focusing lens group L2 forward and rearward to perform an autofocusing operation.

Similar to the first embodiment of the lens barrel 200, immediately after an in-focus state is obtained by the autofocusing operation, the control circuit sends a control signal to the AF motor M to rotate the AF motor M in a rotational direction opposite to the previous rotational direction of the AF motor M for the autofocusing operation by an angle of rotation smaller than backlash between the pinion P and the input gear 32f in the second embodiment of the lens barrel 300. Thereupon, the rotary input shaft 32 rotates in a rotational direction opposite to the previous rotational direction, in which the rotary input shaft 32 rotated immediately before the aforementioned in-focus state is obtained, without rotating the rotary output shaft 15 to thereby reduce the contacting force of each engageable roller 38 with each of the rotary input shaft 32 and the rotary output shaft 15. This reduction of such a contacting force allows the manual focus ring 208 of the lens barrel 300 to be rotated smoothly.

In a state shown in FIG. 12, rotating the manual focus ring 208 of the lens barrel 300 causes the rotary output shaft 15 to rotate clockwise or counterclockwise to perform a manual focusing operation. However, this rotation of the rotary output shaft 15 is not transferred to any of the engageable rollers 38 so as to cause the rotary input shaft 32 to rotate since the inner peripheral surface 15a1 of the rotary output shaft 15 has a circular shape as viewed from the front of the one-way rotational transfer mechanism U2b. In other words, rotating the manual focus ring 208 of the lens barrel 300 does not cause the rotary input shaft 32 to rotate. Consequently, the rotary shaft M1 of the AF motor M does not rotate.

Accordingly, effects similar to those obtained with the second one-way rotational transfer mechanism U2 can also be obtained with the second modification U2b of the second one-way rotational transfer mechanism.

Moreover, due to the utilization of the retainer 34, the annular space RS, which is formed between the small-diameter portion 32a of the rotary input shaft 32 and the rotary output shaft 15, can be used in a space-effective manner. This makes it possible to increase the number of the engageable rollers 38. Increasing the number of the engageable rollers 38 makes it possible to improve the efficiency of transferring torque from the rotary input shaft 32 to the rotary output shaft 15.

Figure 13:
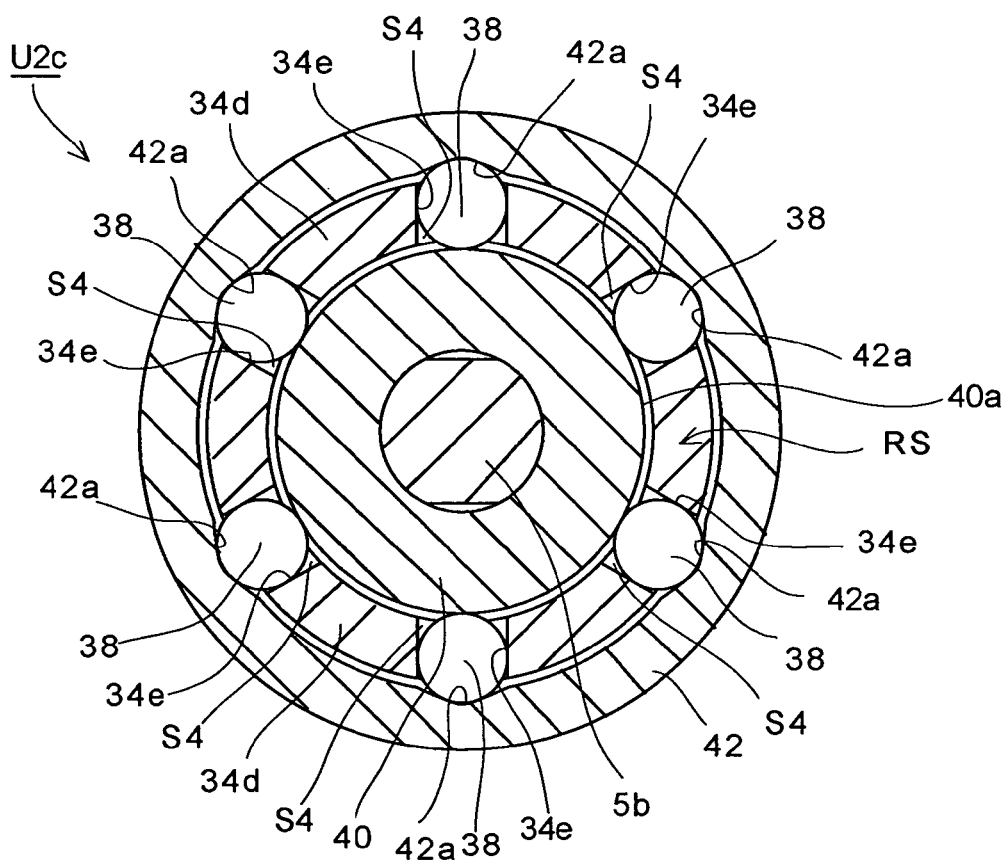
FIG. 13 is a view similar to that of FIG. 12, showing a third modification of the second embodiment of the one-way rotational transfer mechanism.

FIG. 13 shows a third modification of the second embodiment one-way rotational transfer mechanism, in which a rotary input shaft and a rotary output shaft are positioned in a radially reversed fashion; namely, a hollow-cylindrical rotary input shaft 42 is positioned radially outside a hollow-cylindrical rotary output shaft 40. Elements and portions of this one-way rotational transfer mechanism U2c which are similar to those of the one-way rotational transfer mechanism U2b shown in FIGS. 10 through 12 are designated by the same reference numerals.

In the one-way rotational transfer mechanism U2c shown in FIG. 13, the rotary output shaft 40 is rotatably fitted on the large-diameter portion 5b of the rotational shaft 5, while the hollow-cylindrical rotary input shaft 42 is positioned radially outside the rotary output shaft 40 to be rotatable about the axis of the rotational shaft 5. The rotary input shaft 42 is provided, on an inner peripheral surface thereof at equiangular intervals in a circumferential direction of the rotary input shaft 42, with six circumferentially-uneven-depth grooves (second circumferentially-uneven-width-space forming portions/second circumferentially-uneven-depth grooves) 42a which have different radial depths at different circumferential positions. The one-way rotational transfer mechanism U2c is provided between each circumferentially-uneven-depth groove 42a and an outer peripheral surface (second torque transfer cylindrical surface) 40a of the rotary output shaft 40 (the central axis of the outer peripheral surface 42a being coincident with the axis of the rotary output shaft 40) with an accommodation space (second circumferentially-uneven-width space) S4 having different radial widths at different circumferential positions.

The cylindrical portion 34d of the retainer 34 is positioned in the annular space RS (the accommodation spaces S4) that is formed between the rotary input shaft 42 and the rotary output shaft 40 to be rotatable about the axis of the rotational shaft 5. Although not shown in FIG. 7, the three differential rollers 36 are respectively installed in the three fitting holes 34c that are formed on the front wall 34a of the retainer 34 so that each differential roller 36 can freely rotate on the axis C3 thereof. The six differential rollers 36 are held at all times between a rear surface of a front annular flange (not shown), which projects radially outwards from an outer peripheral surface of the rotational shaft 5 to be orthogonal to the axis of the rotational shaft 5, and a front surface (axially-orthogonal surface) of a rear annular flange (not shown) which is positioned behind the aforementioned front annular flange and which projects radially inwards from an inner peripheral surface of the rotary input shaft 42 to be orthogonal to the axis of the rotational shaft 5. Additionally, the retainer 34 is provided on the cylindrical portion 34d thereof in a circumferential direction with six insertion holes 34e, an engageable roller 38 is installed in each insertion hole 34e to be rotatable about the axis C4 and movable along the axis C4 (the axis C4 extending parallel to the axis of the rotational shaft 5), and the six engageable rollers 38 are positioned in the accommodation spaces S4, respectively.

The rotary input shaft 42 is provided with an input gear (not shown) which is in mesh with the pinion P of the AF motor M. In addition, the rotary output shaft 40 is provided with an output gear (not shown) which is in mesh with the input gear 302a of the distance adjustment ring 302.

Immediately after the control circuit in the camera body outputs a forward-rotation drive signal or a reverse-rotation drive signal to the AF motor M to rotate the AF motor M in forward or reverse direction, the rotary input shaft 42 rotates clockwise or counterclockwise as viewed in FIG. 13, while each differential roller 36, the retainer 34 and each engageable roller 38 revolve (rotate) in the same rotational direction as the rotary input shaft 42 at a rotational speed half the rotational speed of the rotary input shaft 42. Thereupon, each engageable roller 38 rotates in the associated accommodation space S4 in a rotational direction opposite to the rotational direction of the rotary input shaft 42 to firmly wedge into one of the wedge-shape (radially-narrowed) circumferentially opposite ends of the associated accommodation space S4 between the associated circumferentially-uneven-depth groove 42a of the rotary input shaft 42 and the outer peripheral surface 40a of the rotary output shaft 40. As a result, the rotation of the rotary input shaft 42 is transferred to the rotary output shaft 40 via each engageable roller 38 to rotate the rotary output shaft 40 in the same rotational direction as the rotary input shaft 42 to perform an autofocusing operation.

Similar to the second one-way rotational transfer mechanism U2, in the third modification U2c of the second one-way rotational transfer mechanism, immediately after an in-focus state is obtained by the autofocusing operation, the control circuit sends a control signal to the AF motor M to rotate the AF motor M in a rotational direction opposite to the previous rotational direction of the AF motor M for the autofocusing operation by an angle of rotation smaller than backlash between the pinion P and the input gear of the rotary input shaft 42. Thereupon, the rotary input shaft 42 rotates in a rotational direction opposite to the previous rotational direction, in which the rotary input shaft 42 rotates immediately before the aforementioned in-focus state is obtained, without rotating the rotary output shaft 40 to thereby reduce the contacting force of each engageable roller 38 with each of the rotary input shaft 42 and the rotary output shaft 40. This reduction of such a contacting force allows the manual focus ring 208 of the lens barrel 300 to be rotated smoothly.

In a state shown in FIG. 13, rotating the manual focus ring 208 of the lens barrel 300 causes the rotary output shaft 40 to rotate clockwise or counterclockwise. However, this rotation of the rotary output shaft 40 is not transferred to any of the engageable rollers 38 since the outer peripheral surface 40a of the rotary output shaft 40 has a circular shape as viewed from the front of the one-way rotational transfer mechanism U2c, so that rotating the manual focus ring 208 of the lens barrel 300 does not cause the rotary input shaft 42 to rotate.

Accordingly, effects similar to those obtained in the second modification U2b of the second one-way rotational transfer mechanism can be obtained in the third modification U2c of the second one-way rotational transfer mechanism.

In each of the above described embodiments of the one-way rotational transfer mechanisms U2, U2a, U2b and U2c, each differential roller 21 or 36 can be replaced by a simple spherical member and also each engageable roller 23 or 38 can also be replaced by a simple spherical member if the efficiency of transferring torque from the rotary input shaft 7, 27, 32 or 42, respectively, to the rotary output shaft 15, 25 or 40 does not have to be taken into account.

Figure 14:
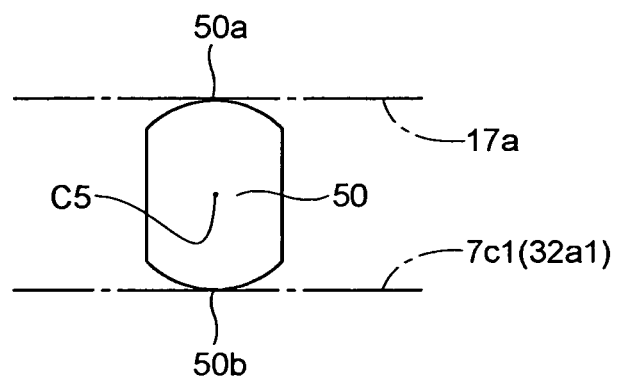
FIG. 14 is a cross sectional view of a modification of a differential roller, taken along a plane orthogonal to the axis of the differential roller.

Each differential roller 21 or 36 can be replaced by a differential roller 50 such as shown in FIG. 14. The differential roller 50 is formed so that an axis C5 thereof extends in a radial direction of the rotary input shaft (7 or 32) or the rotary input shaft (27 or 42), and so that the cross sectional shape of the differential roller 50 is the same as that shown in FIG. 14 at any axial position on the axis C5. In this case, the rotary input shaft (7 or 32) or the rotary input shaft (27 or 42) is rotated via each differential roller 50 in a range so that a pair of arc portions 50a and 50b of the differential roller 50 remain engaged with the pressing surface 17a of the annular member 17 and the axially-orthogonal surface (7c1 or 32a) of the rotary input shaft (7 or 32), respectively, to make each engageable roller 23 or 38 wedge firmly between the rotary input shaft (7 or 32) and the rotary output shaft 15 or between the rotary input shaft (27 or 42) and the rotary output shaft (25 or 40).

In addition, each differential roller 21, 36 or 50 and each engageable roller 23 or 38 can be installed only in a single accommodation space S1, S2, S3 or S4 if the efficiency of transferring torque from the rotary input shaft 7, 27, 32 or 42 to the rotary output shaft 15, 25 or 40 does not have to be taken into account.

The efficiency of transferring torque transferred from the rotary input shaft (7, 27, 32 or 42) to the rotary output shaft (25 or 40) can be changed by the following factors: internal angles of the wedge-shaped opposite end portions that are formed between the outer peripheral surface 15a1 of the large-diameter-portion 15a of the rotary output shaft 15 and each side surface 7d1 of the small-diameter portion 7d of the rotary input shaft 7 or between the outer peripheral surface 15a1 and each circumferentially-uneven-depth groove 32e, internal angles of the wedge-shaped opposite ends that are formed between the outer peripheral surface 25a of the rotary output shaft 25 and each side surface 27a of the rotary input shaft 27, or internal angles of the wedge-shaped opposite ends that are formed between the outer peripheral surface 40a of the rotary output shaft 40 and each side surface 42a of the rotary input shaft 42; or by the following factors: the spring force of the compression coil spring 19, the surface friction of the axially-orthogonal surface 7c1, 27b or 32a1, and the surface friction of the pressing surface 17a of the annular member 17.

In addition, the first one-way rotational transfer mechanism U1 can be modified so that an annular projection corresponding to the annular projection 208b is formed on the manual focus ring 208 to be positioned radially outside the distance adjustment ring 210 or 302, so that a set of accommodation recesses corresponding to the set of accommodation recesses 212 are formed on an inner peripheral surface of the annular projection of the manual focus ring 208, an outer peripheral surface of a front portion of the distance adjustment ring 210 or 302 is formed as a first torque transfer cylindrical surface corresponding to the inner peripheral surface 210c or 302c, a set of first circumferentially-uneven-width spaces corresponding to the set of accommodation spaces SS are formed between the first torque transfer cylindrical surface and each pair of circumferentially-uneven-depth grooves 214 and the associated flat portion 216, and a set of different rollers and corresponding pairs of engaging rollers which correspond to the set of differential roller 218 and the corresponding pairs of engageable rollers 224 are installed between the set of accommodation recesses and the first torque transfer cylindrical surface, respectively.

Although each of the second one-way rotational transfer mechanism U2 and the first through third modifications thereof U2a, U2b and U2c are applied to a focusing mechanism of a lens barrel, each of the second one-way rotational transfer mechanism U2 and the first through third modifications thereof U2a, U2b and U2c can be applied to a zooming mechanism of a zoom lens barrel. Namely, the lens barrel 300 can be modified so that a distance adjustment ring for moving a movable ring which holds at least one zoom lens group along an optical axis is manually rotated by a zoom ring (hand-operated ring) when a power zoom switch is OFF, so that the distance adjustment ring is driven to rotate by a zoom motor (motor) in association with rotation of the zoom ring when the power zoom switch is ON, and so that the one-way rotational transfer mechanism U2, U2a, U2b or U2c is positioned between the zoom motor and the distance adjustment ring.

If the lens barrel 300 is modified in this manner, the distance adjustment ring rotates by a driving force of the zoom motor to perform a zooming operation if the zoom ring is rotated with the power zoom switch ON. On the other hand, a zooming operation is performed manually if the zoom ring is manually rotated with the power zoom switch OFF. However, when the power zoom switch is OFF, the second one-way rotational transfer mechanism (U2, U2a, U2b or U2c) does not transfer any torque from the distance adjustment ring rotated by the rotation of the zoom ring to the zoom motor. Accordingly, the zoom motor does not apply any resistance to rotation of the zoom ring, which makes a smooth manual zooming operation possible.

Figure 15:
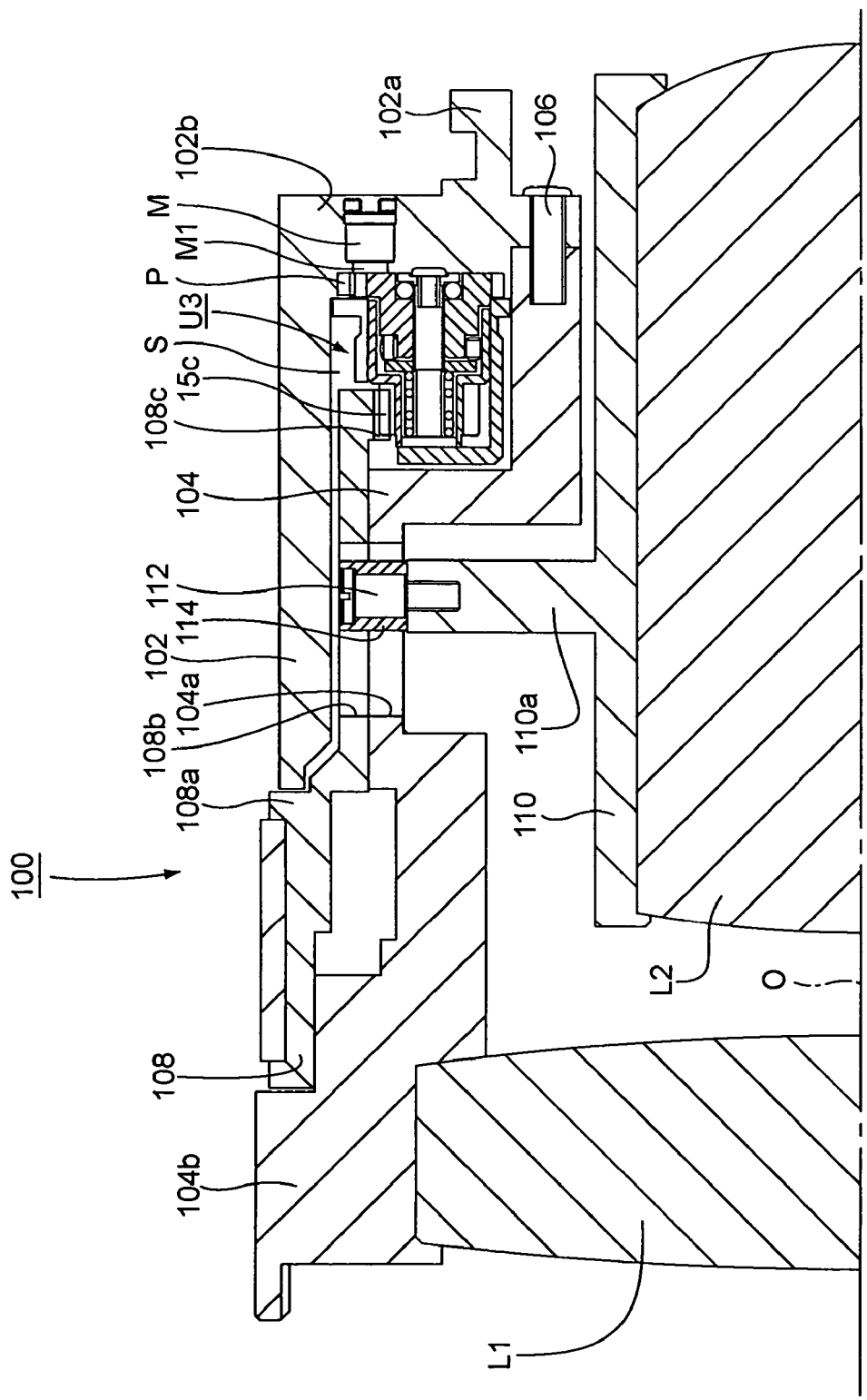
FIG. 15 is a longitudinal cross sectional view of an upper half of a third embodiment of the lens barrel from the optical axis thereof according to the present invention.

FIG. 15 shows a third embodiment of the lens barrel which is switchable for both autofocus (AF) and manual focus (MF). Firstly, the overall structure of this lens barrel 100 will be discussed hereinafter.

(2-0029)

In the following descriptions, the front and rear of the lens barrel 100 correspond to the left and right sides of the lens barrel 100 as viewed in FIG. 15, respectively. The lens barrel 100 is provided in the rear thereof with a first stationary ring 102 having a mount portion (bayonet mount portion) 102a at the rear end of the first stationary ring 102. The mount portion 102a is mounted to a body mount provided on a camera body (not shown) via a bayonet engagement when the lens barrel 100 is attached to the camera body. The lens barrel 100 is provided inside the first stationary ring 102 with a second stationary ring 104, the rear end of which is fixed to the rear end of the first stationary ring 102 by set screws 106 (only one of them is shown in FIG. 15). A stationary lens group L1 is positioned in the second stationary ring 104 to be held by an inner peripheral surface of a front end portion of the second stationary ring 104. The second stationary ring 104 is greater in length than the first stationary ring 102 in the optical axis direction, and is provided, at equi-angular intervals in a circumferential direction of the second stationary ring 104, with a set of three linear guide slots 104a extending in a direction of an optical axis O of the lens barrel 100, i.e., in the optical axis direction. The lens barrel 100 is provided between the first stationary ring 102 and the second stationary ring 104 with an accommodation space S which is seen as an annular space as viewed from the front of the lens barrel 100. The lens barrel 100 is provided in the accommodation space S with a manual focus ring (hand-operated ring) 108 which is concentrically positioned with the first stationary ring 102 to be freely rotatable about the optical axis O. A rotatable operating portion 108a serving as a front end portion of the manual focus ring 108 is positioned in an annular space formed between a front end portion of the first stationary ring 102 and a front end portion 104b of the second stationary ring 104. The manual focus ring 108 is provided with a set of cam grooves 108b (only one of them is shown in FIG. 15) which extend obliquely to the set of three linear guide slots 104a. The manual focus ring 108 is provided, circumferentially on the inner peripheral surface of a rear end of the manual focus ring 108, with an input gear 108c.

The lens barrel 100 is provided radially inside the second stationary ring 104 with a movable ring 110 for holding a focusing lens group (movable lens group) L2. The movable ring 110 is concentrically positioned with the first stationary ring 102 to be freely movable along the optical axis O without rotating about the optical axis O. The movable ring 110 is provided on an outer peripheral surface thereof at equi-angular intervals in a circumferential direction with a set of three radial projections 110a. A roller 114 is fixed to an end surface of each radial projection 110a. Each roller 114 is engaged with both the associated linear guide slot 104a and the associated cam groove 108b, so that forward and reverse rotations of the manual focus ring 108 cause the focusing lens group L2 (the movable ring 110) to move forward and rearward in the optical axis direction along the set of three linear guide slots 104a, respectively.

Figure 16:
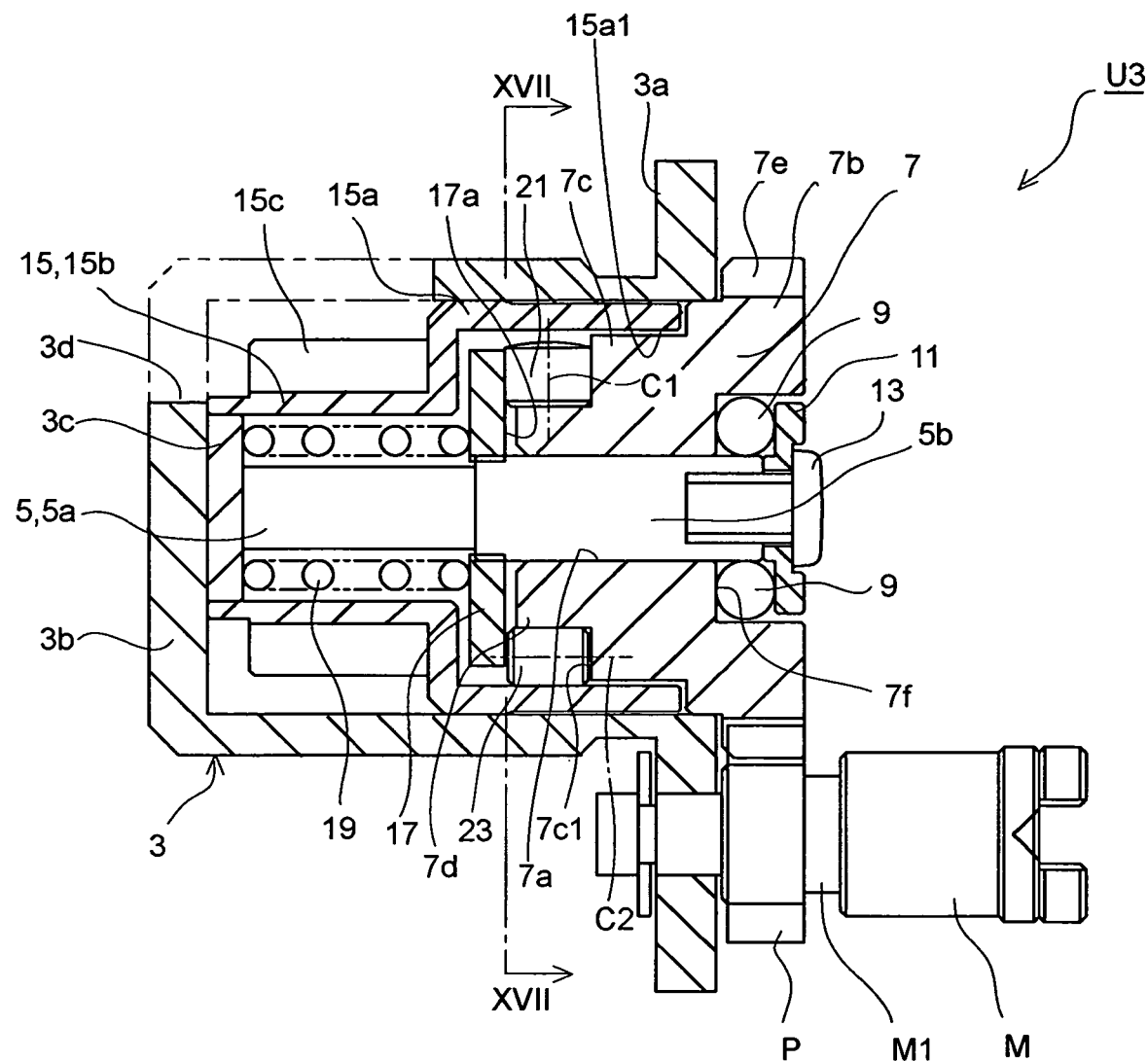
FIG. 16 is a longitudinal cross sectional view of a third one-way rotational transfer mechanism incorporated in the lens barrel shown in FIG. 15.
Figure 17:
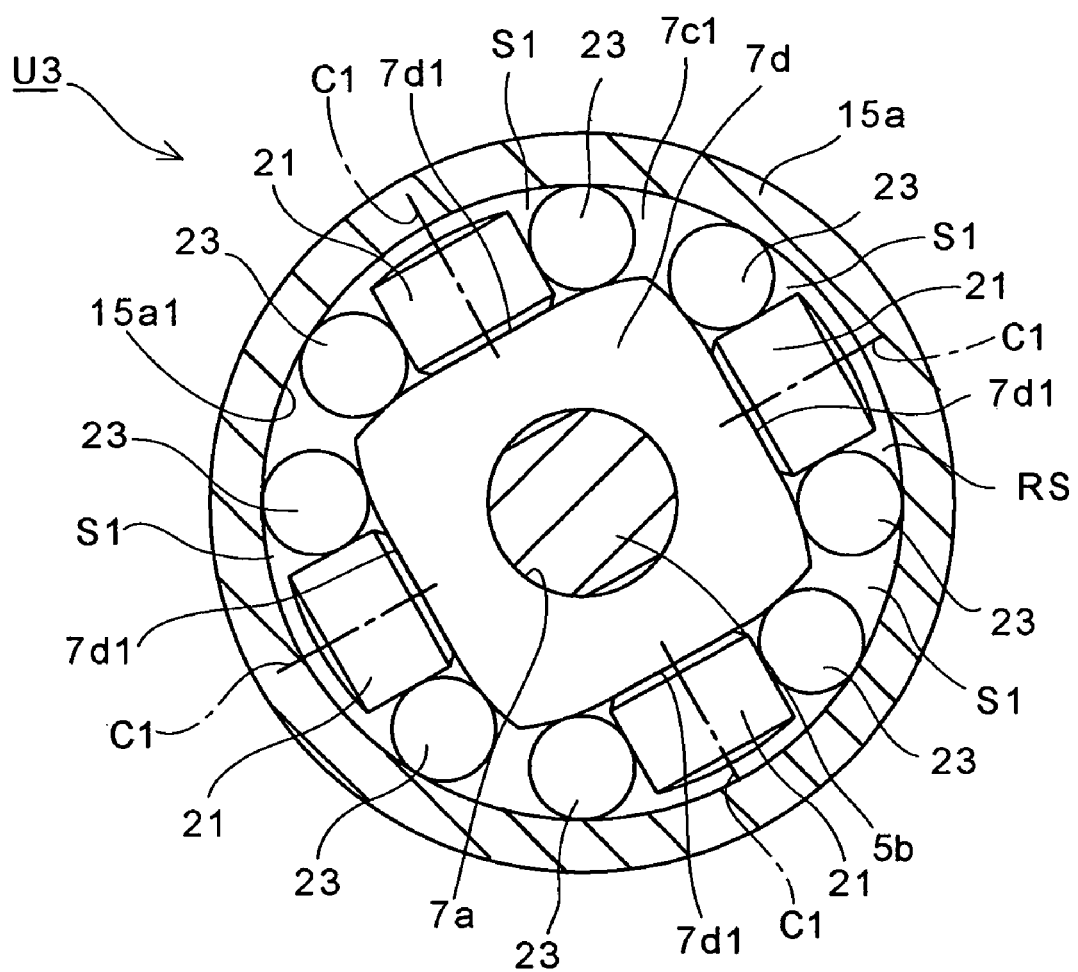
FIG. 17 is a cross sectional view taken along XVII—XVII line shown in FIG. 16.

An AF motor M is embedded in a rear wall 102b of the first stationary ring 102 so that a rotary shaft M1 and a pinion (output gear) P of the motor M project forward to be positioned inside the accommodation space S. The lens barrel 100 is provided in the accommodation space S with a one-way rotational transfer mechanism (third one-way rotational transfer mechanism) U3 via which the pinion P and the manual focus ring 108 are associated with each other (via the input gear 108c). The third one-way rotational transfer mechanism U3 shown in FIGS. 16 and 17 is the same as the second one-way rotational transfer mechanism U2 shown in FIGS. 7 and 8 except that the output gear 15c of the rotary output shaft 15 is in mesh with the input gear 108c of the manual focus ring 108 in the third one-way rotational transfer mechanism U3 so that the pinion P of the motor M and the manual focus ring 108 are associated with each other via the third one-way rotational transfer mechanism U3, whereas the output gear 15c of the rotary output shaft 15 is in mesh with the input gear 302a of the distance adjustment ring 302 in the second one-way rotational transfer mechanism U2 so that the pinion P of the motor M and the distance adjustment ring 302 are associated with each other via the second one-way rotational transfer mechanism U2. Accordingly, detailed descriptions of the third one-way rotational transfer mechanism U3 are omitted from the following descriptions.

Similar to the lens barrel 300, the lens barrel 100 is provided with an AF switch (not shown) for enabling or disabling AF photography (i.e., for switching between AF mode and MF mode).

Operations of the lens barrel 100 having the above described structure will be discussed hereinafter.

Firstly, operations of the lens barrel 100 when a focusing operation is performed in autofocus mode will be hereinafter discussed.

The aforementioned AF switch is switched ON beforehand so that the lens barrel 100 can perform an autofocusing operation.

Immediately after a control circuit (not shown) provided in the camera body outputs a forward-rotation drive signal to the AF motor M to rotate the AF motor M in a forward direction, a forward rotation of the AF motor M is transferred to the rotary input shaft 7 via the engagement of the pinion P with the input gear 7e, so that the rotary input shaft 7 rotates counterclockwise as viewed in FIG. 17. Thereupon, each differential roller 21 that is held between the pressing surface 17a of the annular member 17 and the axially-orthogonal surface 7c1 of the rotary input shaft 7 revolves (rotates) around the axis of the rotary input shaft 7 in the same rotational direction (counterclockwise direction) as the rotary input shaft 7 while rotating about the axis C1 of the differential roller 21 in the associated accommodation space S1. During this movement of each differential roller 21, provided that no slip occurs either between each differential roller 21 and the pressing surface 17a or between each differential roller 21 and the axially-orthogonal surface 7c1, the rotational speed of each differential roller 21 around the axis of the rotary input shaft 7 is half the rotational speed of the rotary input shaft 7. As a result, each differential roller 21 rotates clockwise relative to the rotary input shaft 7. Therefore, each differential roller 21 comes in contact with one of the associated pair of engageable rollers 23 which is positioned on the clockwise side, and subsequently biases this engageable roller 23 so that it rotates clockwise. This engageable roller 23 rotates clockwise in the associated accommodation space S1 to firmly wedge into that one of the wedge-shape (radially-narrowed) circumferentially opposite end portions of the associated accommodation space S1 which is positioned on the clockwise side in the accommodation space S1 between the associated side surface 7d1 of the small-diameter portion 7d and the inner peripheral surface 15a1 of the large-diameter portion 15a. This causes the small-diameter portion 7d (the rotary input shaft 7) and the rotary output shaft 15 to become integral with each other circumferentially via the wedged engageable rollers 23 so that the rotation of the small-diameter portion 7d is transferred to the rotary output shaft 15 to rotate the rotary output shaft 15 counterclockwise. Thereupon, this rotation of the rotary output shaft 15 is transferred to the input gear 108c via the output gear 15c to rotate the manual focus ring 108 counterclockwise as viewed from the front thereof, thus causing the movable ring 110 together with the focusing lens group L2 to move forward along the optical axis O.

On the other hand, if the control circuit in the camera body outputs a reverse-rotation drive signal to the AF motor M to rotate the AF motor M in reverse direction, a reverse rotation of the AF motor M is transferred to the rotary input shaft 7 via the engagement of the pinion P with the input gear 7e, so that the rotary input shaft 7 rotates clockwise as viewed in FIG. 17. Thereupon, each differential roller 21 revolves (rotates) around the axis of the rotary input shaft 7 in the same rotational direction (clockwise direction) as the rotary input shaft 7 at a rotational speed half the rotational speed of the rotary input shaft 7 while-rotating on the axis C1 of the differential roller 21. As a result, each differential roller 21 revolves counterclockwise relative to the rotary input shaft 7. Therefore, each differential roller 21 comes in contact with the other of the associated pair of engageable rollers 23 that is positioned on the counterclockwise side, and subsequently biases this engageable roller 23 so that it rotates counterclockwise. This engageable roller 23 rotates counterclockwise in the associated accommodation space S1 to firmly wedge into the other of the wedge-shape (radially-narrowed) circumferentially opposite end portions of the associated accommodation space S1, which is positioned on the counterclockwise side in associated accommodation space S1 between the associated side surface 7d1 of the small-diameter portion 7d and the inner peripheral surface 15a1 of the large-diameter portion 15a. This causes the small-diameter portion 7d (the rotary input shaft 7) and the rotary output shaft 15 to become integral with each other circumferentially via the wedged engageable rollers 23, so that the rotation of the small-diameter portion 7d is transferred to the rotary output shaft 15 to rotate the rotary output shaft 15 clockwise. Thereupon, this rotation of the rotary output shaft 15 is transferred to the input gear 108c via the output gear 15c to rotate the manual focus ring 108 clockwise as viewed from the front thereof, thus causing the movable ring 110 together with the focusing lens group L2 to move rearward along the optical axis O.

In this manner the control circuit makes the AF motor M rotate in forward and reverse directions to move the focusing lens group L2 forward and rearward to perform an autofocusing operation.

Immediately after an in-focus state is obtained by the autofocusing operation, the control circuit sends a control signal to the AF motor M to rotate the AF motor M in a rotational direction opposite to the previous rotational direction of the AF motor M by an angle of rotation smaller than backlash between the pinion P and the input gear 7e. Thereupon, the rotary input shaft 7 rotates in a rotational direction opposite to the previous rotational direction, in which the rotary input shaft 7 rotates immediately before the aforementioned in-focus state is obtained, without rotating the rotary output shaft 15 to thereby reduce the contacting force of each engageable roller 23 with each of the associated side surface 7d1 of the small-diameter portion 7d and the inner peripheral surface 15a1 of the large-diameter portion 15a. This reduction of such a contacting force allows the manual focus ring 108 of the lens barrel 100 to be rotated smoothly.

Operations of the lens barrel 100 when a focusing operation is performed in manual focus mode will be hereinafter discussed.

In a state where the AF switch is ON, if the manual focus ring 108 is manually rotated in a forward or reverse rotational direction with no actuation of the AF motor M, this forward or reverse rotation of the manual focus ring 108 causes the movable ring 110 and the focusing lens group L2 to move forward or rearward along the optical axis O to perform a focusing operation (MF operation).

Upon the rotation of the manual focus ring 108, the torque of the manual focus ring 108 is transferred to the output gear 15c of the rotary output shaft 15 via the input gear 108c. Thereafter, the rotary output shaft 15 rotates clockwise or counterclockwise about the rotational shaft 5, whereas no torque is transferred from the rotary output shaft 15 to either each engageable roller 23 or each differential roller 21 since the inner peripheral surface 15a1 of the rotary output shaft 15 has a circular shape as viewed from the front thereof. Therefore, rotation of the rotary output shaft 15 does not cause the small-diameter portion 7d (the rotary input shaft 7) to rotate, so that the rotary shaft M1 of the AF motor M does not rotate.

As described above, according to the third embodiment of the lens barrel 100, an autofocusing operation can be performed by switching the AF switch ON. Moreover, even if the manual focus ring 108 is manually rotated with the AF switch remained ON, no torque of the manual focus ring 108 is transferred to the rotary shaft M1 of the AF motor M, so that the rotary shaft M1 does not apply no resistance to rotation of the manual focus ring 108, which makes a smooth manual focusing operation possible even if the AF switch is not switched from ON to OFF.

A torque can be reliably transferred from the rotary input shaft 7 to the rotary output shaft 15 because each differential roller 21 is made to revolve (rotate) around the rotary input shaft 7 in the same rotational direction as the rotary input shaft 7 while trailing behind the rotation of the rotary input shaft 7 and because each engageable roller 23 is subsequently made to wedge firmly between the associated side surface 7d1 of the small-diameter portion 7d and the inner peripheral surface 15a1 of the large-diameter portion 15a to serve as a torque transfer member. Consequently, an autofocusing operation can be performed with reliability.

Moreover, since each engageable roller 23, which serves as a second torque transfer member, is formed as a cylindrical member, the axis C2 of which being parallel to the axis of the rotational shaft 5, each engageable roller 23 is in contact with each of the rotary input shaft 7 and the rotary output shaft 15 on a contact area greater than that in the case where the second torque transfer member is formed in a spherical member. Therefore, the efficiency of transferring torque from the rotary input shaft 7 to the rotary output shaft 15 in the third embodiment of the lens barrel 100 is higher than that in the case where each second torque transfer member is formed in a spherical member.

The number of the differential rollers 21 or the engageable rollers 23 which are accommodated in each accommodation space S1 can be changed by changing a cross sectional shape of the small-diameter portion 7d to a regular polygonal shape other than a square shape such as a regular triangular shape or a regular pentagonal shape, or by forming the small-diameter portion 7d to have a non-circular cross section so as to include at least one surface orthogonal to a radial direction of the rotary input shaft 7. With a change in the number of the differential rollers 21 or the engageable rollers 23, the efficiency of transferring torque from the rotary input shaft 7 to the rotary output shaft 15 can be adjusted.

The third one-way rotational transfer mechanism U3 incorporated in the third-embodiment of the lens barrel 100 can be replaced by any one of the above described first through third modifications U2a, U2b and U2c of the second one-way rotational transfer mechanism shown in FIGS. 9 through 13. In this case, similar to the above described case that the lens barrel 100 incorporates the third one-way rotational transfer mechanism U3, immediately after an in-focus state is obtained by the autofocusing operation, the control circuit sends a control signal to the AF motor M to rotate the AF motor M in a rotational direction opposite to the previous rotational direction of the AF motor M for the autofocusing operation by an angle of rotation smaller than backlash between the pinion P and the input gear of the rotary input shaft 27. Thereupon, the rotary input shaft 27 rotates in a rotational direction opposite to the previous rotational direction, in which the rotary input shaft 27 rotates immediately before the aforementioned in-focus state is obtained, without rotating the rotary output shaft 25 to thereby reduce the contacting force of each engageable roller 23 with each of the rotary input shaft 27 and the rotary output shaft 25. This reduction of such a contacting force allows the manual focus ring 108 of the lens barrel 100 to be rotated smoothly.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lens barrel comprising:
  a distance adjustment ring which is rotatable by a motor and which moves a movable lens group along said optical axis when said distance adjustment ring is rotated on about an axis thereof;
  a hand-operated ring which rotates said distance adjustment ring when said hand-operated ring is manually rotated; and
  a first one-way rotational transfer mechanism which transfers torque of said hand-operated ring to said distance adjustment ring when said hand-operated ring is manually rotated, and for preventing torque of said distance adjustment ring from being transferred to said hand-operated ring when said distance adjustment ring is rotated by said motor;
  wherein said first one-way rotational transfer mechanism comprises:
  an annular overlapping portion formed on said hand-operated ring and overlaps said distance adjustment ring in a radial direction of said lens barrel;
  a first orthogonal surface formed on said hand-operated ring to lie in a plane orthogonal to an axis of said hand-operated ring;
  a first torque transfer cylindrical surface formed on one of an inner peripheral surface and an outer peripheral surface of said distance adjustment ring to face said annular overlapping portion;
  at least one first circumferentially-uneven-width-space forming portion formed on said annular overlapping portion to form at least one first accommodation space between said annular overlapping portion and said first torque transfer cylindrical surface, said first accommodation space having different radial widths at different circumferential positions;
  a first differential rotating member installed in said first accommodation space, and pressed against said first orthogonal surface by a first biasing device, said first differential rotating member revolving about said axis of said hand-operated ring in a same direction as a rotational direction of said hand-operated ring while revolving at a slower speed than said rotation of said hand-operated ring in association with said rotation of said hand-operated ring; and
  at least one first torque transfer member installed in said first accommodation space, said first torque member revolving around said axis of said hand-operated ring in a same revolving direction as said first differential rotating member when pressed by said first differential rotating member,
  wherein said first circumferentially-uneven-width-space forming portion is shaped so that said first torque transfer member which revolves in a circumferential direction about said axis of said hand-operated ring wedges between said circumferentially-uneven-width-space forming portion and said first torque transfer cylindrical surface to transfer said torque of said hand-operated ring to said distance adjustment ring when said hand-operated ring is manually rotated.

2. The lens barrel according to claim 1, wherein said first torque transfer member comprises a pair of first torque transfer members which are provided on opposite sides of said first differential rotating member in said circumferential direction in a manner so as to support said first differential rotating member.

3. The lens barrel according to claim 1, wherein at least a portion of said first circumferentially-uneven-width-space forming portion is formed by at least one first circumferentially-uneven-depth groove having different radial depths at different circumferential positions.

4. The lens barrel according to claim 1, further comprising a first pressing member having a first pressing surface which faces said first orthogonal surface to be parallel thereto,
  wherein said first pressing member is continuously biased toward said first orthogonal surface by said first biasing device to hold said first differential rotating member between said first pressing surface and said first orthogonal surface.

5. The lens barrel according to claim 1, wherein said first accommodation space comprises a plurality of first accommodation spaces formed between said annular overlapping portion and said first torque transfer cylindrical surface, and wherein said first differential rotating member and said first torque transfer member are installed in each of said plurality of first accommodation spaces.

6. The lens barrel according to claim 1, wherein said first torque transfer member is formed as a cylindrical member having an axis which is parallel to said axis of said hand-operated ring.

7. The lens barrel according to claim 1, further comprising a second one-way rotational transfer mechanism which transfers a driving force of said motor to said distance adjustment ring when said motor is driven, and for preventing said torque of said distance adjustment ring from being transferred to said motor when said distance adjustment ring is rotated.

8. The lens barrel according to claim 1, wherein said movable lens group serves as a focusing lens group, wherein said motor serves as an AF motor which moves said movable lens group along said optical axis to perform a focusing operation, and wherein said hand-operated ring serves as a manual focus ring which is manually rotated to perform said focusing operation.

9. The lens barrel according to claim 1, wherein said movable lens group is an element of a zooming optical system of said lens barrel, wherein said motor serves as a zoom motor which moves said movable lens group along said optical axis to perform said zooming operation, and wherein said hand-operated ring serves as a zoom ring which is manually rotated to perform said zooming operation.

10. The one-way rotational transfer mechanism according to claim 1, wherein said second biasing device comprises an annular leaf spring.

11. The lens barrel according to claim 7, wherein said second one-way rotational transfer mechanism comprises:

a rotary input shaft which is driven to rotate by said motor, said rotary input shaft including a second orthogonal surface lying on a plane orthogonal to an axis of said rotary input shaft which is parallel to said optical axis;

a hollow-cylindrical rotary output shaft provided around said rotary input shaft to be freely rotatable relative to said rotary input shaft, wherein rotation of said hollow-cylindrical rotary output shaft and rotation of said distance adjustment ring are associated with each other;

a second circumferentially-uneven-width-space forming portion formed on said rotary input shaft to form at least one second accommodation space between said rotary input shaft and a second torque transfer cylindrical surface formed on an inner peripheral surface of said hollow-cylindrical rotary output shaft, said second accommodation space having different radial widths at different circumferential positions;

a second differential rotating member installed in said second accommodation space, and pressed against said second orthogonal surface by a second biasing device, said second differential rotating member revolving around an axis of said rotary input shaft in a same direction as a rotational direction of said rotary input shaft while revolving at a slower speed than said rotation of said rotary input shaft in association with said rotation of said rotary input shaft; and at least one second torque transfer member installed in said second accommodation space to be freely movable therein, said second torque transfer member revolving around said axis of said rotary input shaft in a same revolving direction as said second differential rotating member when pressed by said second differential rotating member, wherein said second circumferentially-uneven-width-space forming portion is shaped so that said second torque transfer member which revolves in a circumferential direction about said axis of said rotary input shaft wedges between an outer peripheral surface of said rotary input shaft and said second torque transfer cylindrical surface of said hollow-cylindrical rotary output shaft to transfer a torque from said rotary input shaft to said hollow-cylindrical rotary output shaft when said rotary input shaft is rotated.

12. The lens barrel according to claim 11, wherein said second circumferentially-uneven-width-space forming portion comprises a portion having a non-circular cross section which includes at least one surface orthogonal to a radial direction of said rotary input shaft.

13. The lens barrel according to claim 11, wherein said second torque transfer member comprises a pair of second torque transfer members which are positioned on opposite sides of associated said second differential rotating member along said circumferential direction in a manner so as to hold said associated said second differential rotating member.

14. The lens barrel according to claim 11, wherein said second accommodation space comprises a plurality of second accommodation spaces formed between said second circumferentially-uneven-width-space forming portion and said second torque transfer cylindrical surface of said hollow-cylindrical rotary output shaft, and said second differential rotating member comprises a plurality of second differential rotating members;

wherein one of said second differential rotating members and said at least one second torque transfer member are installed in each of said plurality of second accommodation spaces.

15. The lens barrel according to claim 14, further comprising a second pressing member having a second pressing surface which faces said second orthogonal surface to be parallel thereto, wherein said second pressing member is continuously biased toward said second orthogonal surface by said second biasing device to hold said second differential rotating member between said second pressing surface and said second orthogonal surface.

16. The lens barrel according to claim 11, further comprising a second pressing member having a second pressing surface which faces said second orthogonal surface to be parallel thereto, wherein said second pressing member is continuously biased toward said second orthogonal surface by said second biasing device to hold said second differential rotating member between said second pressing surface and said second orthogonal surface.

17. The lens barrel according to claim 11, wherein said rotary input shaft comprises an input gear which is in mesh with an output gear of said motor, wherein, upon rotation of said hollow-cylindrical rotary output shaft being stopped, said motor is rotated in a rotational direction opposite to the previous rotational direction of said motor by an angle of rotation smaller than backlash between said input gear and said output gear to rotate said rotary input shaft in a rotational direction opposite to the previous rotational direction of said rotary input shaft without rotating said hollow-cylindrical rotary output shaft.

18. The lens barrel according to claim 11, wherein said second torque transfer member is formed as a cylindrical member, an axis of which is parallel to said axis of said rotary input shaft.

19. The one-way rotational transfer mechanism according to claim 8, wherein said second biasing device comprises a compression coil spring.

20. The lens barrel according to claim 7, wherein said second one-way rotational transfer mechanism comprises:
a hollow-cylindrical rotary input shaft driven to rotate by said motor, said hollow-cylindrical rotary input shaft including a second orthogonal surface lying on a plane orthogonal to an axis of said hollow-cylindrical rotary input shaft which is parallel to said optical axis;
a rotary output shaft provided radially inside said hollow-cylindrical rotary input shaft to be freely rotatable relative to said hollow-cylindrical rotary input shaft, an outer peripheral surface of said rotary output shaft serving as a second torque transfer cylindrical surface, wherein rotation of said rotary output shaft and rotation of said distance adjustment ring are associated with each other;
a second circumferentially-uneven-width-space forming portion formed on an inner peripheral surface of said hollow-cylindrical rotary input shaft to form at least one second accommodation space between said inner peripheral surface of said hollow-cylindrical rotary input shaft and said second torque transfer cylindrical surface, said second accommodation space having different radial widths at different circumferential positions;
a second differential rotating member installed in said second accommodation space, and pressed against said second orthogonal surface by a second biasing device, said second differential rotating member revolving around an axis of said hollow-cylindrical rotary input shaft in a same direction as a rotational direction of said hollow-cylindrical rotary input shaft while revolving at a slower speed than said rotation of said hollow-cylindrical rotary input shaft in association with said rotation of said hollow-cylindrical rotary input shaft; and
at least one second torque transfer member installed in said second accommodation space to be freely movable therein, said second torque transfer member revolving around said axis of said hollow-cylindrical rotary input shaft in a same revolving direction as said second differential rotating member when pressed by said second differential rotating member,
wherein said second circumferentially-uneven-width-space forming portion is shaped so that said second torque transfer member which revolves in a circumferential direction about said axis of said hollow-cylindrical rotary input shaft wedges between said inner peripheral surface of said hollow-cylindrical rotary input shaft and said second torque transfer cylindrical surface of said rotary output shaft to transfer a torque from said hollow-cylindrical rotary input shaft to said rotary output shaft when said hollow-cylindrical rotary input shaft is rotated.

21. The lens barrel according to claim 20, wherein said second torque transfer member comprises a pair of second torque transfer members which are positioned on opposite sides of associated said second differential rotating member along said circumferential direction in a manner so as to hold said associated said second differential rotating member.

22. The lens barrel according to claim 20, wherein said second accommodation space comprises a plurality of second accommodation spaces formed between said second circumferentially-uneven-width-space forming portion and said second torque transfer cylindrical surface of said rotary output shaft, and said second differential rotating member comprises a plurality of second differential rotating members;
wherein one of said second differential rotating members and said at least one second torque transfer member are installed in each of said plurality of second accommodation spaces.

23. The lens barrel according to claim 22, further comprising a second pressing member having a second pressing surface which faces said second orthogonal surface to be parallel thereto,
wherein said second pressing member is continuously biased toward said second orthogonal surface by said second biasing device to hold said second differential rotating member between said second pressing surface and said second orthogonal surface.

24. The lens barrel according to claim 20, further comprising a second pressing member having a second pressing surface which faces said second orthogonal surface to be parallel thereto,
wherein said second pressing member is continuously biased toward said second orthogonal surface by said second biasing device to hold said second differential rotating member between said second pressing surface and said second orthogonal surface.

25. The lens barrel according to claim 20, wherein said second circumferentially-uneven-width-space forming portion comprises at least one second circumferentially-uneven-depth groove having different radial depths at different circumferential positions.

26. The lens barrel according to claim 20, wherein said hollow-cylindrical rotary input shaft comprises an input gear which is in mesh with an output gear of said motor,
wherein, upon rotation of said rotary output shaft being stopped, said motor is rotated in a rotational direction opposite to the previous rotational direction of said motor by an angle of rotation smaller than backlash between said input gear and said output gear to rotate said hollow-cylindrical rotary input shaft in a rotational direction opposite to the previous rotational direction of said hollow-cylindrical rotary input shaft without rotating said rotary output shaft.

27. The lens barrel according to claim 20, wherein said second torque transfer member is formed as a cylindrical member, an axis of which is parallel to said axis of said hollow-cylindrical rotary input shaft.

28. The lens barrel according to claim 7, wherein said second one-way rotational transfer mechanism comprises:
a rotary input shaft which is driven to rotate by said motor, said rotary input shaft including a second orthogonal surface lying on a plane orthogonal to an axis of said rotary input shaft which is parallel to said optical axis;
a hollow-cylindrical rotary output shaft provided around said rotary input shaft to be freely rotatable relative to said rotary input shaft, an inner peripheral surface of said hollow-cylindrical rotary output shaft serving as a second torque transfer cylindrical surface for forming an annular space between said second torque transfer cylindrical surface and an outer peripheral surface of said rotary input shaft, wherein rotation of said hollow-cylindrical rotary output shaft and rotation of said distance adjustment ring are associated with each other;

a second circumferentially-uneven-width-space forming portion formed on said rotary input shaft to form at least one second accommodation space between said rotary input shaft and said second torque transfer cylindrical surface, said second accommodation space having different radial widths at different circumferential positions, and said second accommodation space forming a portion of said annular space which is formed between said second torque transfer cylindrical surface and said outer peripheral surface of said rotary input shaft;

a second differential rotating member pressed against said second orthogonal surface by a second biasing device, said second differential rotating member revolving around said axis of said rotary input shaft in a same direction as a rotational direction of said rotary input shaft while revolving at a slower speed than said rotation of said rotary input shaft in association with said rotation of said rotary input shaft;

a retainer installed in said annular space, said retainer rotating around said axis of said rotary input shaft in a same rotational direction as said second differential rotating member when pressed by said second differential rotating member; and at least one second torque transfer member supported by said retainer to rotate together with said retainer in said second accommodation space, wherein said second circumferentially-uneven-width-space forming portion is shaped so that said second torque transfer member which rotates in a circumferential direction about said axis of said rotary input shaft wedges between an outer peripheral surface of said rotary input shaft and said second torque transfer cylindrical surface of said hollow-cylindrical rotary output shaft to transfer a torque from said rotary input shaft to said hollow-cylindrical rotary output shaft when said rotary input shaft is rotated.

29. The lens barrel according to claim 28, wherein said second accommodation space comprises a plurality of second accommodation spaces formed between said hollow-cylindrical rotary output shaft and said second torque transfer cylindrical surface, and wherein said second torque transfer member is installed in each said plurality of second accommodation spaces.

30. The lens barrel according to claim 28, wherein said second circumferentially-uneven-width-space forming portion comprises at least one second circumferentially-uneven-depth groove having different radial depths at different circumferential positions.

31. The lens barrel according to claim 28, wherein said rotary input shaft comprises an input gear which is in mesh with an output gear of said motor, wherein, upon rotation of said hollow-cylindrical rotary output shaft being stopped, said motor is rotated in a rotational direction opposite to the previous rotational direction of said motor by an angle of rotation smaller than backlash between said input gear and said output gear to rotate said rotary input shaft in a rotational direction opposite to the previous rotational direction of said rotary input shaft without rotating said hollow-cylindrical rotary output shaft.

32. The lens barrel according to claim 28, wherein said second torque transfer member is formed as a cylindrical member, an axis of which is parallel to said axis of said rotary input shaft.

33. The lens barrel according to claim 28, wherein said second torque transfer member is formed as a cylindrical member, an axis of which is parallel to said axis of said rotary input shaft.

34. The lens barrel according to claim 7, wherein said second one-way rotational transfer mechanism comprises:

a hollow-cylindrical rotary input shaft which is driven to rotate by said motor, said hollow-cylindrical input shaft including an orthogonal surface lying on a plane orthogonal to an axis of said hollow-cylindrical rotary input shaft which is parallel to said optical axis;

a rotary output shaft provided radially inside said hollow-cylindrical rotary input shaft to be freely rotatable relative to said hollow-cylindrical rotary input shaft, an outer peripheral surface of said rotary output shaft serving as a second torque transfer cylindrical surface for forming an annular space between said second torque transfer cylindrical surface and an inner peripheral surface of said hollow-cylindrical rotary input shaft, wherein rotation of said rotary output shaft and rotation of said distance adjustment ring are associated with each other;

a second circumferentially-uneven-width-space forming portion formed on said hollow-cylindrical rotary input shaft to form at least one second accommodation space between said hollow-cylindrical rotary input shaft and said second torque transfer cylindrical surface, said second accommodation space having different radial widths at different circumferential positions, and said second accommodation space forming a portion of said annular space that is formed between said second torque transfer cylindrical surface and said inner peripheral surface of said hollow-cylindrical rotary input shaft;

a second differential rotating member pressed against said second orthogonal surface by a second biasing device, said second differential rotating member revolving around said axis of said hollow-cylindrical rotary input shaft in a same direction as a rotational direction of said hollow-cylindrical rotary input shaft while revolving at a slower speed than said rotation of said hollow-cylindrical rotary input shaft in association with said rotation of said hollow-cylindrical rotary input shaft;

a retainer installed in said annular space, said retainer rotating around said axis of said hollow-cylindrical rotary input shaft in a same rotational direction as said second differential rotating member when pressed by said second differential rotating member; and at least one second torque transfer member supported by said retainer to rotate together with said retainer in said second accommodation space, wherein said second circumferentially-uneven-width-space forming portion is shaped so that said second torque transfer member which rotates in a circumferential direction about said axis of said hollow-cylindrical rotary input shaft wedges between an inner peripheral surface of said hollow-cylindrical rotary input shaft and said second torque transfer cylindrical surface of said rotary output shaft to transfer a torque from said hollow-cylindrical rotary input shaft to said rotary output shaft when said hollow-cylindrical rotary input shaft is rotated.

35. The lens barrel according to claim 34, wherein said second accommodation space comprises a plurality of second accommodation spaces formed between said rotary output shaft and said second torque transfer cylindrical surface, and wherein said second torque transfer member is installed in each said plurality of second accommodation spaces.

36. The lens barrel according to claim 34, wherein said second circumferentially-uneven-width-space forming portion comprises at least one second circumferentially-uneven-depth groove having different radial depths at different circumferential positions.

37. The lens barrel according to claim 34, wherein said hollow-cylindrical rotary input shaft comprises an input gear which is in mesh with an output gear of said motor,
wherein, upon rotation of said rotary output shaft being stopped, said motor is rotated in a rotational direction opposite to the previous rotational direction of said motor by an angle of rotation smaller than backlash between said input gear and said output gear to rotate said hollow-cylindrical rotary input shaft in a rotational direction opposite to the previous rotational direction of said hollow-cylindrical rotary input shaft without rotating said rotary output shaft.

38. The lens barrel according to claim 34, wherein said second torque transfer member is formed as a cylindrical member, an axis of which is parallel to said axis of said hollow-cylindrical rotary input shaft.

39. The lens barrel according to claim 34, wherein said second torque transfer member is formed as a cylindrical member, an axis of which is parallel to said axis of said hollow-cylindrical rotary input shaft.

40. A lens barrel comprising:
a hand-operated ring which moves a movable lens group along an optical axis thereof when manually rotated;
a motor for moving said movable lens group along said optical axis; and
a one-way rotational transfer mechanism which transfers torque of said motor to said movable lens group when said motor is driven, and for preventing a moving force of said movable lens group from being transferred to said motor when said hand-operated ring is manually rotated;
wherein said one-way rotational transfer mechanism comprises:
a rotary input shaft driven to rotate by said motor, said rotary input shaft including an orthogonal surface lying on a plane orthogonal to an axis of said rotary input shaft which is parallel to said optical axis;
a hollow-cylindrical rotary output shaft provided around said rotary input shaft to be freely rotatable relative to said rotary input shaft, wherein rotation of said hollow-cylindrical rotary output shaft and a movement of said movable lens group along said optical axis are associated with each other;
a circumferentially-uneven-width-space forming portion formed on said rotary input shaft to form at least one accommodation space between said rotary input shaft and a torque transfer cylindrical surface formed on an inner peripheral surface of said hollow-cylindrical rotary output shaft, said accommodation space having different radial widths at different circumferential positions;
a differential rotating member installed in said accommodation space, and pressed against said orthogonal surface by a biasing device, said differential rotating member revolving around an axis of said rotary input shaft in a same direction as a rotational direction of said rotary input shaft while revolving at a slower speed than said rotation of said rotary input shaft in association with said rotation of said rotary input shaft; and
at least one torque transfer member installed in said accommodation space to be freely movable therein, said torque transfer member revolving around said axis of said rotary input shaft in a same revolving direction as said differential rotating member when pressed by said differential rotating member,
wherein said circumferentially-uneven-width-space forming portion is shaped so that said torque transfer member which revolves in a circumferential direction about said axis of said rotary input shaft wedges between an outer peripheral surface of said rotary input shaft and said torque transfer cylindrical surface of said hollow-cylindrical rotary output shaft to transfer a torque from said rotary input shaft to said hollow-cylindrical rotary output shaft when said rotary input shaft is rotated.

41. The lens barrel according to claim 40, wherein said torque transfer member comprises a pair of torque transfer members which are positioned on opposite sides of associated said differential rotating member along said circumferential direction in a manner so as to support said associated said differential rotating member.

42. The lens barrel according to claim 40, wherein said accommodation space comprises a plurality of accommodation spaces formed between said rotary input shaft and said torque transfer cylindrical surface, and said differential rotating member comprises a plurality of differential rotating members;
wherein one of said differential rotating members and said at least one said torque transfer member are installed in each said plurality of accommodation spaces.

43. The lens barrel according to claim 40, wherein said circumferentially-uneven-width-space forming portion comprises a portion having a non-circular cross section which includes at least one surface orthogonal to a radial direction of said rotary input shaft.

44. The lens barrel according to claim 40, further comprising a pressing member having a pressing surface which faces said orthogonal surface so as to be parallel thereto,
wherein said pressing member is biased toward said orthogonal surface by said biasing device to support said differential rotating member between said pressing surface and said orthogonal surface.

45. The lens barrel according to claim 40, wherein said rotary input shaft comprises an input gear which is in mesh with an output gear of said motor,
wherein, upon rotation of said rotary output shaft being stopped, said motor is rotated in a rotational direction opposite to the previous rotational direction of said motor by an angle of rotation smaller than backlash between said input gear and said output gear to rotate said rotary input shaft in a rotational direction opposite to the previous rotational direction of said rotary input shaft without rotating said rotary output shaft.

46. The lens barrel according to claim 40, wherein said torque transfer member is formed as a cylindrical member, an axis of which is parallel to said axis of said rotary input shaft.

47. The one-way rotational transfer mechanism according to claim 40, wherein said biasing device comprises a compression coil spring.

48. A lens barrel comprising:
a hand-operated ring which moves a movable lens group along an optical axis thereof when manually rotated;
a motor for moving said movable lens group along said optical axis; and a one-way rotational transfer mechanism which transfers torque of said motor to said movable lens group when said motor is driven, and for preventing a moving force of said movable lens group from being transferred to said motor when said hand-operated ring is manually rotated;
wherein said one-way rotational transfer mechanism comprises:
a hollow-cylindrical rotary input shaft driven to rotate by said motor, said hollow-cylindrical rotary input shaft including an orthogonal surface lying on a plane orthogonal to an axis of said hollow-cylindrical rotary input shaft which is parallel to said optical axis;
a rotary output shaft provided radially inside said hollow-cylindrical rotary input shaft to be freely rotatable relative to said hollow-cylindrical rotary input shaft, an outer peripheral surface of said rotary output shaft serving as a torque transfer cylindrical surface, wherein rotation of said rotary output shaft and movement of said movable lens group along said optical axis are associated with each other;
a circumferentially-uneven-width-space forming portion formed on an inner peripheral surface of said hollow-cylindrical rotary input shaft to form at least one accommodation space between said inner peripheral surface of said hollow-cylindrical rotary input shaft and said torque transfer cylindrical surface, said accommodation space having different radial widths at different circumferential positions;
a differential rotating member installed in said accommodation space, and pressed against said orthogonal surface by a biasing device, said differential rotating member revolving around an axis of said hollow-cylindrical rotary input shaft in a same direction as a rotational direction of said hollow-cylindrical rotary input shaft while revolving at a slower speed than said rotation of said hollow-cylindrical rotary input shaft in association with said rotation of said hollow-cylindrical rotary input shaft; and
at least one torque transfer member installed in said accommodation space to be freely movable therein, said torque transfer member revolving around said axis of said hollow-cylindrical rotary input shaft in a same revolving direction as said differential rotating member when pressed by said differential rotating member,
wherein said circumferentially-uneven-width-space forming portion is shaped so that said torque transfer member which revolves in a circumferential direction about said axis of said hollow-cylindrical rotary input shaft wedges between said inner peripheral surface of said hollow-cylindrical rotary input shaft and said torque transfer cylindrical surface of said rotary output shaft to transfer a torque from said hollow-cylindrical rotary input shaft to said rotary output shaft when said hollow-cylindrical rotary input shaft is rotated.

49. The lens barrel according to claim 48, wherein said torque transfer member comprises a pair of torque transfer members which are positioned on opposite sides of associated said differential rotating member along said circumferential direction in a manner so as to support said associated said differential rotating member.

50. The lens barrel according to claim 48, wherein said accommodation space comprises a plurality of accommodation spaces formed between said hollow-cylindrical rotary input shaft and said torque transfer cylindrical surface, and said differential rotating member comprises a plurality of differential rotating members;
wherein one of said differential rotating members and said at least one torque transfer member are installed in each said plurality of accommodation spaces.

51. The lens barrel according to claim 48, wherein said circumferentially-uneven-width-space forming portion comprises a portion having a non-circular cross section which includes at least one surface orthogonal to a radial direction of said hollow-cylindrical rotary input shaft.

52. The lens barrel according to claim 48, further comprising a pressing member having a pressing surface which faces said orthogonal surface so as to be parallel thereto,
wherein said pressing member is biased toward said orthogonal surface by said biasing device to support said differential rotating member between said pressing surface and said orthogonal surface.

53. The lens barrel according to claim 48, wherein said rotary input shaft comprises an input gear which is in mesh with an output gear of said motor,
wherein, upon rotation of said rotary output shaft being stopped, said motor is rotated in a rotational direction opposite to the previous rotational direction of said motor by an angle of rotation smaller than backlash between said input gear and said output gear to rotate said rotary input shaft in a rotational direction opposite to the previous rotational direction of said rotary input shaft without rotating said rotary output-shaft.

54. The lens barrel according to claim 48, wherein said torque transfer member is formed as a cylindrical member, an axis of which is parallel to said axis of said rotary input shaft.

55. The one-way rotational transfer mechanism according to claim 48, wherein said biasing device comprises a compression coil spring.

56. A lens barrel comprising:
a hand-operated ring which moves a movable lens group along an optical axis thereof when manually rotated;
a motor for moving said movable lens group along said optical axis; and
a one-way rotational transfer mechanism which transfers torque of said motor to said movable lens group when said motor is driven, and for preventing a moving force of said movable lens group from being transferred to said motor when said hand-operated ring is manually rotated;
wherein said one-way rotational transfer mechanism comprises:
a rotary input shaft driven to rotate by said motor, said rotary input shaft including an orthogonal surface lying on a plane orthogonal to an axis of said rotary input shaft which is parallel to said optical axis;
a hollow-cylindrical rotary output shaft provided around said rotary input shaft to be freely rotatable relative to said rotary input shaft, an inner peripheral surface of said hollow-cylindrical rotary output shaft serving as a torque transfer cylindrical surface for forming an annular space between said torque transfer cylindrical surface and an outer peripheral surface of said rotary input shaft, wherein rotation of said hollow-cylindrical rotary output shaft and movement of said movable lens group along said optical axis are associated with each other;
a circumferentially-uneven-width-space forming portion formed on said rotary input shaft to form at least one accommodation space between said rotary input shaft and said torque transfer cylindrical surface, said accommodation space having different radial widths at different circumferential positions, and said accommodation space forming a part of said annular space that is formed between said torque transfer cylindrical surface and said outer peripheral surface of said rotary input shaft;

a differential rotating member pressed against said orthogonal surface by a biasing device, said differential rotating member revolving around said axis of said rotary input shaft in a same direction as a rotational direction of said rotary input shaft while revolving at a slower speed than said rotation of said rotary input shaft in association with said rotation of said rotary input shaft;

a retainer installed in said annular space, said retainer rotating around said axis of said rotary input shaft in a same rotational direction as said differential rotating member when pressed by said differential rotating member; and at least one torque transfer member supported by said retainer to rotate together with said retainer in said accommodation space, wherein said circumferentially-uneven-width-space forming portion is shaped so that said torque transfer member which rotates in a circumferential direction about said axis of said rotary input shaft wedges between an outer peripheral surface of said rotary input shaft and said torque transfer cylindrical surface of said hollow-cylindrical rotary output shaft to transfer a torque from said rotary input shaft to said hollow-cylindrical rotary output shaft when said rotary input shaft is rotated.

57. The lens barrel according to claim 56, wherein said accommodation space comprises a plurality of accommodation spaces formed between said rotary input shaft and said torque transfer cylindrical surface, and wherein said torque transfer member is installed in each said plurality of accommodation spaces.

58. The lens barrel according to claim 56, wherein said circumferentially-uneven-width-space forming portion comprises at least one circumferentially-uneven-depth groove having different radial depths at different circumferential positions.

59. The lens barrel according to claim 56, further comprising a pressing member having a pressing surface which faces said orthogonal surface so as to be parallel thereto, wherein said pressing member is biased toward said orthogonal surface by said biasing device to support said differential rotating member between said pressing surface and said orthogonal surface.

60. The lens barrel according to claim 56, wherein said rotary input shaft comprises an input gear which is in mesh with an output gear of said motor, wherein, upon rotation of said rotary output shaft being stopped, said motor is rotated in a rotational direction opposite to the previous rotational direction of said motor by an angle of rotation smaller than backlash between said input gear and said output gear to rotate said rotary input shaft in a rotational direction opposite to the previous rotational direction of said rotary input shaft without rotating said rotary output shaft.

61. The lens barrel according to claim 56, wherein said torque transfer member is formed as a cylindrical member, an axis of which is parallel to said axis of said rotary input shaft.

62. The one-way rotational transfer mechanism according to claim 56, wherein said biasing device comprises a compression coil spring.

63. A lens barrel comprising:

a hand-operated ring which moves a movable lens group along an optical axis thereof when manually rotated;

a motor for moving said movable lens group along said optical axis; and a one-way rotational transfer mechanism which transfers torque of said motor to said movable lens group when said motor is driven, and for preventing a moving force of said movable lens group from being transferred to said motor when said hand-operated ring is manually rotated;

wherein said one-way rotational transfer mechanism comprises:

a hollow-cylindrical rotary input shaft driven to rotate by said motor, said hollow-cylindrical rotary input shaft including an orthogonal surface lying on a plane orthogonal to an axis of said hollow-cylindrical rotary input shaft which is parallel to said optical axis;

a rotary output shaft provided radially inside said hollow-cylindrical rotary input shaft to be freely rotatable relative to said hollow-cylindrical rotary input shaft, an outer peripheral surface of said rotary output shaft serving as a torque transfer cylindrical surface for forming an annular space between said torque transfer cylindrical surface and an inner peripheral surface of said hollow-cylindrical rotary input shaft, wherein rotation of said rotary output shaft and movement of said movable lens group along said optical axis are associated with each other;

a circumferentially-uneven-width-space forming portion formed on said hollow-cylindrical rotary input shaft to form at least one accommodation space between said hollow-cylindrical rotary input shaft and said torque transfer cylindrical surface, said accommodation space having different radial widths at different circumferential positions, and said accommodation space forming a portion of said annular space that is formed between said torque transfer cylindrical surface and said inner peripheral surface of said hollow-cylindrical rotary input shaft;

a differential rotating member pressed against said orthogonal surface by a biasing device, said differential rotating member revolving around said axis of said hollow-cylindrical rotary input shaft in a same direction as a rotational direction of said hollow-cylindrical rotary input shaft while revolving at a slower speed than said rotation of said hollow-cylindrical rotary input shaft in association with said rotation of said hollow-cylindrical rotary input shaft;

a retainer installed in said annular space, said retainer rotating around said axis of said hollow-cylindrical rotary input shaft in a same rotational direction as said differential rotating member when pressed by said differential rotating member; and at least one torque transfer member supported by said retainer to rotate together with said retainer in said accommodation space, wherein said circumferentially-uneven-width-space forming portion is shaped so that said torque transfer member which rotates in a circumferential direction about said axis of said hollow-cylindrical rotary input shaft wedges between an inner peripheral surface of said hollow-cylindrical rotary input shaft and said torque transfer cylindrical surface of said rotary output shaft to transfer a torque from said hollow-cylindrical rotary input shaft to said rotary output shaft when said hollow-cylindrical rotary input shaft is rotated.

64. The lens barrel according to claim 63, wherein said accommodation space comprises a plurality of accommodation spaces formed between said hollow-cylindrical rotary input shaft and said torque transfer cylindrical surface, and wherein said torque transfer member is installed in each said plurality of accommodation spaces.

65. The lens barrel according to claim 63, wherein said circumferentially-uneven-width-space forming portion comprises at least one circumferentially-uneven-depth groove having different radial depths at different circumferential positions.

66. The lens barrel according to claim 63, further comprising a pressing member having a pressing surface which faces said orthogonal surface so as to be parallel thereto, wherein said pressing member is biased toward said orthogonal surface by said biasing device to support said differential rotating member between said pressing surface and said orthogonal surface.

67. The lens barrel according to claim 63, wherein said rotary input shaft comprises an input gear which is in mesh with an output gear of said motor, wherein, upon rotation of said rotary output shaft being stopped, said motor is rotated in a rotational direction opposite to the previous rotational direction of said motor by an angle of rotation smaller than backlash between said input gear and said output gear to rotate said rotary input shaft in a rotational direction opposite to the previous rotational direction of said rotary input shaft without rotating said rotary output shaft.

68. The lens barrel according to claim 63, wherein said torque transfer member is formed as a cylindrical member, an axis of which is parallel to said axis of said rotary input shaft.

69. The one-way rotational transfer mechanism according to claim 63, wherein said biasing device comprises a compression coil spring.

* * * * *